US008167467B2

(12) United States Patent
Iida et al.

(10) Patent No.: US 8,167,467 B2
(45) Date of Patent: May 1, 2012

(54) REAR LAMP ASSEMBLY FOR A SADDLE-TYPE VEHICLE, AND VEHICLE INCORPORATING SAME

(75) Inventors: Rinatsu Iida, Saitama (JP); Gen Tanabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 251 days.

(21) Appl. No.: 12/718,529

(22) Filed: Mar. 5, 2010

(65) Prior Publication Data
US 2010/0244493 A1     Sep. 30, 2010

(30) Foreign Application Priority Data

Mar. 31, 2009 (JP) ................................. 2009-087775

(51) Int. Cl.
*B62J 6/02* (2006.01)
(52) U.S. Cl. ........................................................ 362/473
(58) Field of Classification Search .................... 362/473
See application file for complete search history.

(56) References Cited

U.S. PATENT DOCUMENTS

| 6,218,952 | B1* | 4/2001 | Borland et al. ............... 340/641 |
| 7,559,679 | B2* | 7/2009 | Isayama et al. ............... 362/522 |
| 8,016,308 | B2* | 9/2011 | Ishikawa et al. .......... 280/152.1 |
| 2002/0139596 | A1* | 10/2002 | Yagisawa et al. ............. 180/219 |
| 2005/0017862 | A1* | 1/2005 | Monck et al. ................. 340/469 |
| 2006/0266572 | A1* | 11/2006 | Iwanaga ........................ 180/225 |
| 2007/0025113 | A1* | 2/2007 | Isayama et al. ............... 362/473 |
| 2007/0035420 | A1* | 2/2007 | Yamada et al. ................. 341/50 |
| 2007/0109113 | A1* | 5/2007 | Owen ........................... 340/464 |
| 2007/0139596 | A1* | 6/2007 | Kim et al. ..................... 349/129 |
| 2007/0230202 | A1* | 10/2007 | Ohzono ........................ 362/516 |
| 2008/0066987 | A1* | 3/2008 | Ito et al. ........................ 180/227 |
| 2008/0202835 | A1* | 8/2008 | Suita et al. .................... 180/219 |
| 2008/0217087 | A1* | 9/2008 | Ito et al. ........................ 180/220 |
| 2008/0285292 | A1* | 11/2008 | Medina ......................... 362/473 |
| 2009/0185388 | A1* | 7/2009 | Kageyama .................... 362/473 |
| 2009/0196056 | A1* | 8/2009 | Kageyama .................... 362/473 |

FOREIGN PATENT DOCUMENTS

JP            P4104344          4/2008

* cited by examiner

*Primary Examiner* — Lori Lyjak
(74) *Attorney, Agent, or Firm* — Carrier Blackman & Associates, P.C.; Joseph P. Carrier; William D. Blackman

(57) ABSTRACT

A saddle-type vehicle is provided with a rear cowl for covering a rear portion of a body frame, while having an opening capable of being closed with a rider's seat. The vehicle also includes a rear lamp assembly including a tail lamp bulb and a pair of turn signal bulbs, with stays being provided on the upper side of the rear lamp assembly. The rear lamp assembly is mounted to the body frame with a center cover, for covering the upper side of a tail lamp part of the combination lamp, and turn signal covers, for covering the upper side of turn signal parts and turn signal sockets in the combination lamp. The turn signal covers each have an arm located below the rider's seat and extending toward the inner side in the vehicle width direction, and the arm is fastened to the stay.

16 Claims, 22 Drawing Sheets

REAR LAMP ASSEMBLY FOR A SADDLE-TYPE VEHICLE, AND VEHICLE INCORPORATING SAME

CROSS-REFERENCE TO RELATED APPLICATIONS

The present invention claims priority under 35 USC §119 based on Japanese patent application No. 2009-087775, filed 31 Mar. 2009. The subject matter of this priority document, including specification, claims and drawings, is incorporated by reference herein.

BACKGROUND OF THE INVENTION

1. Field of the Invention

The present invention relates to a rear lamp assembly for a saddle-type vehicle, and to a vehicle incorporating the impact member. More particularly, the present invention relates to a saddle-type vehicle wherein a rear lamp is mounted to the body frame with stays provided on the upper side in the rear lamp, which includes a center cover for covering the upper side of a tail lamp part of the rear lamp and turn signal covers for covering the upper side of turn signal parts and turn signal sockets in the combination lamp.

2. Description of the Background Art

A motorcycle design is known in which a rear lamp assembly as a whole can be removed from a rear cowl, and a tail lamp bulb and a pair of turn signal bulbs can be replaced while the rear lamp is in the removed state; see, for example, Japanese Patent No. 4104344 (JP '344).

However, in the rear lamp assembly according to JP '344, in order for maintenance to be performed on the rear lamp, the entire rear lamp assembly must be removed, as a whole, from the rear cowl. Since the rear lamp assembly must be removed from the rear cowl, depending on the structure of the vehicle, it may be difficult, expensive, and/or time consuming to remove the rear lamp assembly as a whole, in order to perform even routine maintenance (such as the changing of a lamp bulb). Accordingly, there is a need for a rear lamp assembly which enables maintenance to be carried out in a more simple operation.

The present invention has been made in consideration of the above-mentioned circumstances. Accordingly, it is an object of the present invention to provide a saddle-type vehicle in which maintenance of a rear lamp can be carried out easily.

SUMMARY OF THE INVENTION

In order to attain the above object, the present invention according to a first aspect hereof provides a rear lamp assembly for a saddle-type vehicle (e.g. motorcycle). The saddle-type vehicle includes, at a rear portion of a body frame, a rear cowl for covering a rear portion of the body frame. An opening is provided at an upper portion of the rear cowl which is capable of being closed by a rider's seat. A rear lamp, having a tail lamp and a left-right pair of turn signals, is positioned in the rear cowl such that a rear portion of the rear lamp is disposed in a rear portion of the rear cowl wherein the rear lamp is exposed (when the vehicle is viewed from the back) at the rear end of the rear cowl.

The rear lamp according to the first aspect hereof is characterized in that stays are provided on the upper side. The vehicle further includes a center cover for covering the upper side of a tail lamp part of the rear lamp, and turn signal covers for covering the upper side of turn signal parts and turn signal sockets in the rear lamp, and each of the turn signal covers has an arm located below the rider's seat and extending toward the inner side in the vehicle width direction, the arm being fastened to the stay.

In the saddle-type vehicle according to the first aspect of the present invention, the arm of each of the turn signal covers, which extends inwardly in the vehicle width direction, is fastened to the stay of the rear lamp. This ensures that when a fastener of the arm is released, it is possible to remove only the turn signal cover. Removal of the turn signal cover causes the turn signal socket to be exposed, whereby replacement of the lamps is easily facilitated.

The present invention according to a second aspect is characterized in that, in addition to the first aspect, the center cover is provided with ribs which extend downward at side portions of the cover and the ribs are each provided with a slit therein. Each of the turn signal covers is provided, on the sides of the inner surface, with a interlocking engagement to be locked into one of the slits in the center cover.

In the saddle-type vehicle according to the second aspect of the present invention, the interlocking engagement of each of the turn signal covers is slidingly locked into one of the slits which is formed in the ribs provided on the center cover, whereby movement (backlash) of the turn signal cover in the slit width direction is restricted. Further, during removal of the turn signal cover, the turn signal cover can be kept tentatively fixed to the center cover by the slit and the interlocking engagement, so that workability can be enhanced.

The present invention according to a third aspect is characterized in that, in addition to the first aspect, a rear fender is mounted below the rear cowl such that the rear fender covers the upper side of a rear wheel, and a lower surface of the turn signal cover is fastened to a lower surface of the rear fender.

In the saddle-type vehicle according to the third aspect of the present invention, an upper portion of the turn signal cover is fixed to the stay by the arm, and a lower portion of the turn signal cover is fixed to the rear fender, thereby enhancing the fixation strength of the turn signal cover.

The invention according to a fourth aspect of the present invention is characterized in that, in addition to the first aspect, the stay is formed at a base of the rear lamp, and the arm of the turn signal cover and the center cover are fastened to the stay of the rear lamp, wherein the rear surface of the rear lamp is a reflective surface.

In the saddle-type vehicle according to the fourth aspect of the present invention, locating the stay at the base of the rear lamp makes it possible to fix both the turn signal cover and the center cover to the same location, without using any fixing member for exclusive use.

The present invention according to a fifth aspect is characterized in that, in addition to the first aspect, the turn signal covers and the center cover are provided at their rear portions with rear interlocking engagements each of which is engaged with a recess formed in an upper surface of the rear lamp.

In the saddle-type vehicle according to the fifth aspect, rear portions of the turn signal covers and the center cover are engaged with and fixed to the rear lamp by the interlocking engagements and the recesses, which makes it possible to reduce the size of the rear lamp as compared with a fixing structure based on the use of fastening members.

The present invention according to a sixth aspect is characterized in that, in addition to the first aspect, the center cover is provided, at rear portions thereof, with recesses for engagement with rear portions of the inside edges of the turn signal covers, and each of the turn signal covers is provided, at a rear portion of a lower surface thereof, with a recess for engagement with a rear edge of the center cover.

In the saddle-type vehicle according to the sixth aspect, the forwardly facing recess of the turn signal cover is fitted to the rearwardly facing recess provided at the rear portion of the center cover such that the rear portions of the center cover and the turn signal cover are engaged with each other through projection-recess engagement. Therefore, mating and holding of the turn signal covers and the center cover at their rear portions can be more secure.

According to the saddle-type vehicle of the first aspect of the present invention, release of the fastener of the turn signal cover arm when the seat has been removed makes it possible to remove only the turn signal cover from the vehicle. Removal of the turn signal cover causes the turn signal socket in the rear lamp to be exposed. Therefore, maintenance of the turn signals can be carried out by only removing the turn signal covers.

According to the saddle-type vehicle of the second aspect of the present invention, the turn signal cover and the center cover are locked to each other by the slits of the center cover and the interlocking engagements of the turn signal covers, so that the turn signal covers can be prevented from backlashing when they are mounted. In addition, at the time of removing the turn signal covers, the fastener of the turn signal cover arm is released, thereby allowing the turn signal cover to be slid in the direction along the slit to release the locking between the interlocking engagement and the slit such that the turn signal cover is drawn out toward the outer side. Therefore, the turn signal cover can be removed easily.

According to the saddle-type vehicle of the third aspect of the present invention, the turn signal covers are fastened in the vertical direction, such that vertical vibrations of the turn signal covers can be prevented.

According to the saddle-type vehicle of the fourth aspect of the present invention, providing stays at the based on the rear lamp such that the turn signal cover arms and the center cover are both fastened to the stay thereby reducing the number of parts.

According to the saddle-type vehicle of the fifth aspect of the present invention, the gaps between the rear lamp upper surface and the turn signal covers as well as the center cover can be reduced, such that vibrations of the rear ends of both the covers can be minimized.

According to the saddle-type vehicle of the sixth aspect of the present invention, mating and holding of the turn signal covers and the center cover at their rear portions can be achieved more assuredly.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Figure 1:
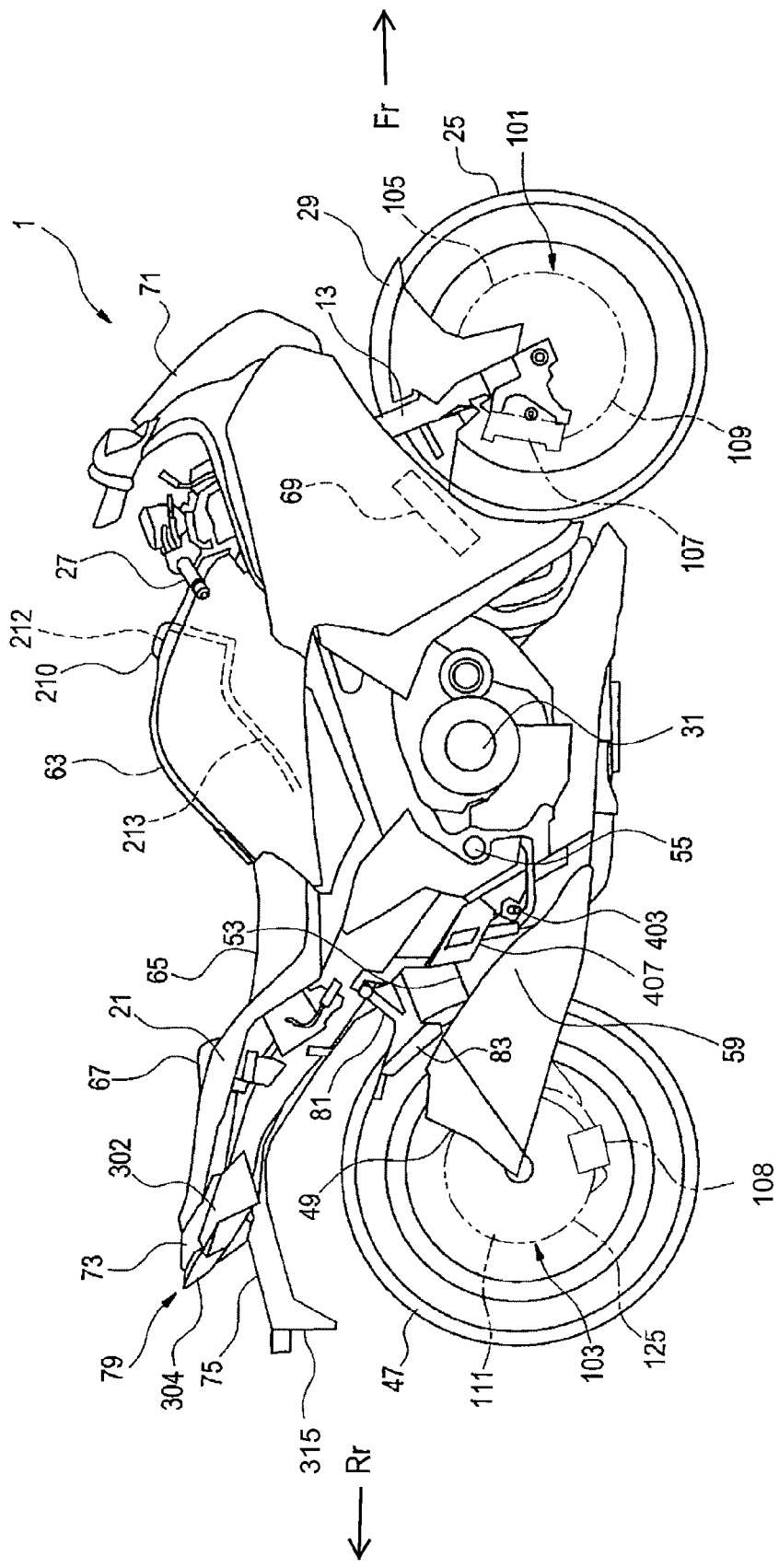
FIG. 1 is a right side plan view showing a basic configuration of a saddle-type vehicle according to an illustrative embodiment of the present invention.

Now, an illustrative embodiment of the saddle-type vehicle according to the present invention will be described in detail below referring to the drawings. Incidentally, the drawings are to be looked at according to the posture of reference symbols. In the following description, the front and rear sides, the left and right sides, and the upper and lower sides are those as viewed from the driver of the vehicle. In the drawings, the front side of the vehicle is denoted by Fr, the rear side by Rr, the left side by L, the right side by R, the upper side by U, and the lower side (downward side) by D.

The present invention is applicable to a saddle-type vehicle such as, e.g. a motorcycle.

Figure 2:
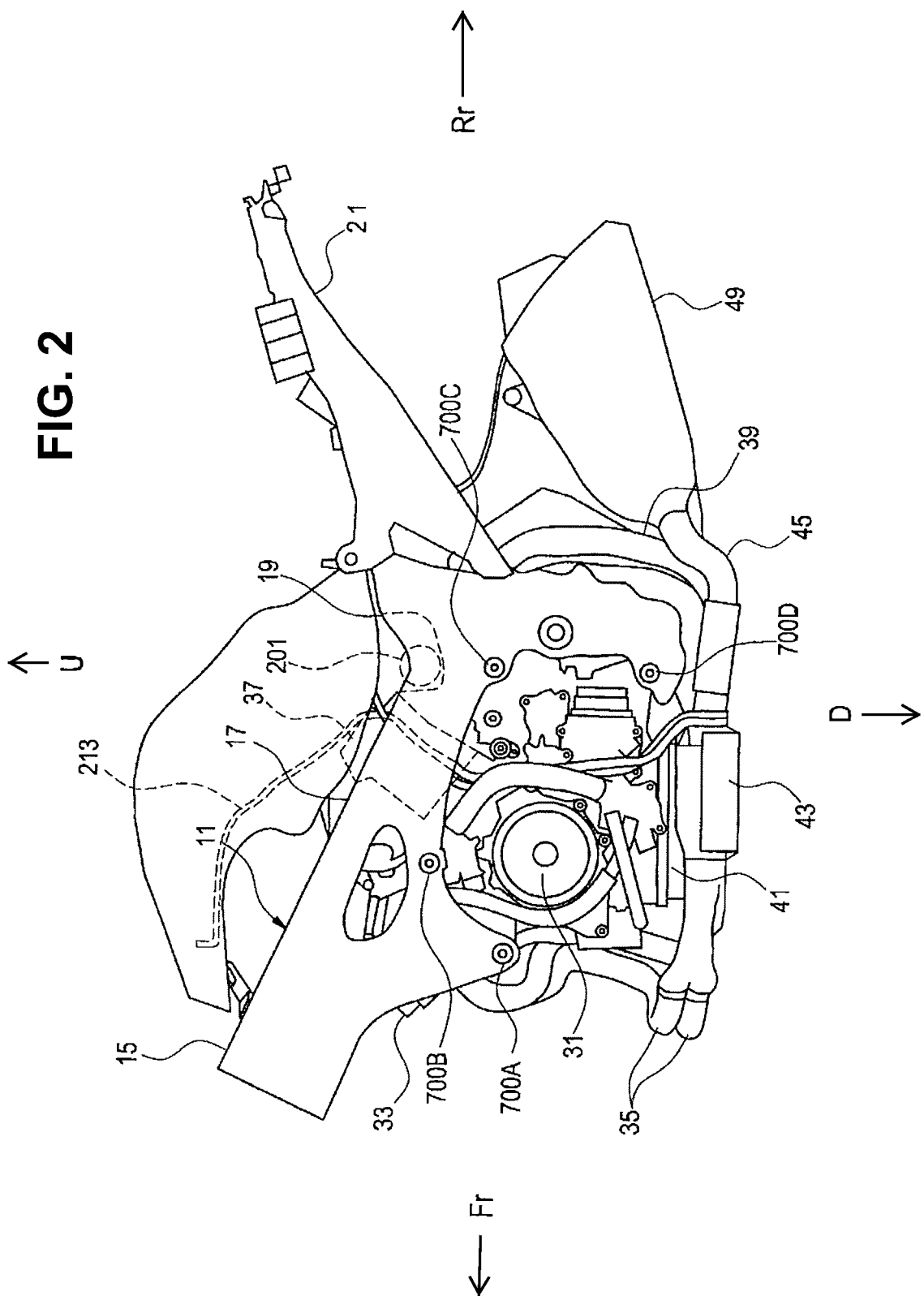
FIG. 2 is a left side detail view of a vehicle body of a saddle-type vehicle according to an illustrative embodiment of the present invention.
Figure 3:
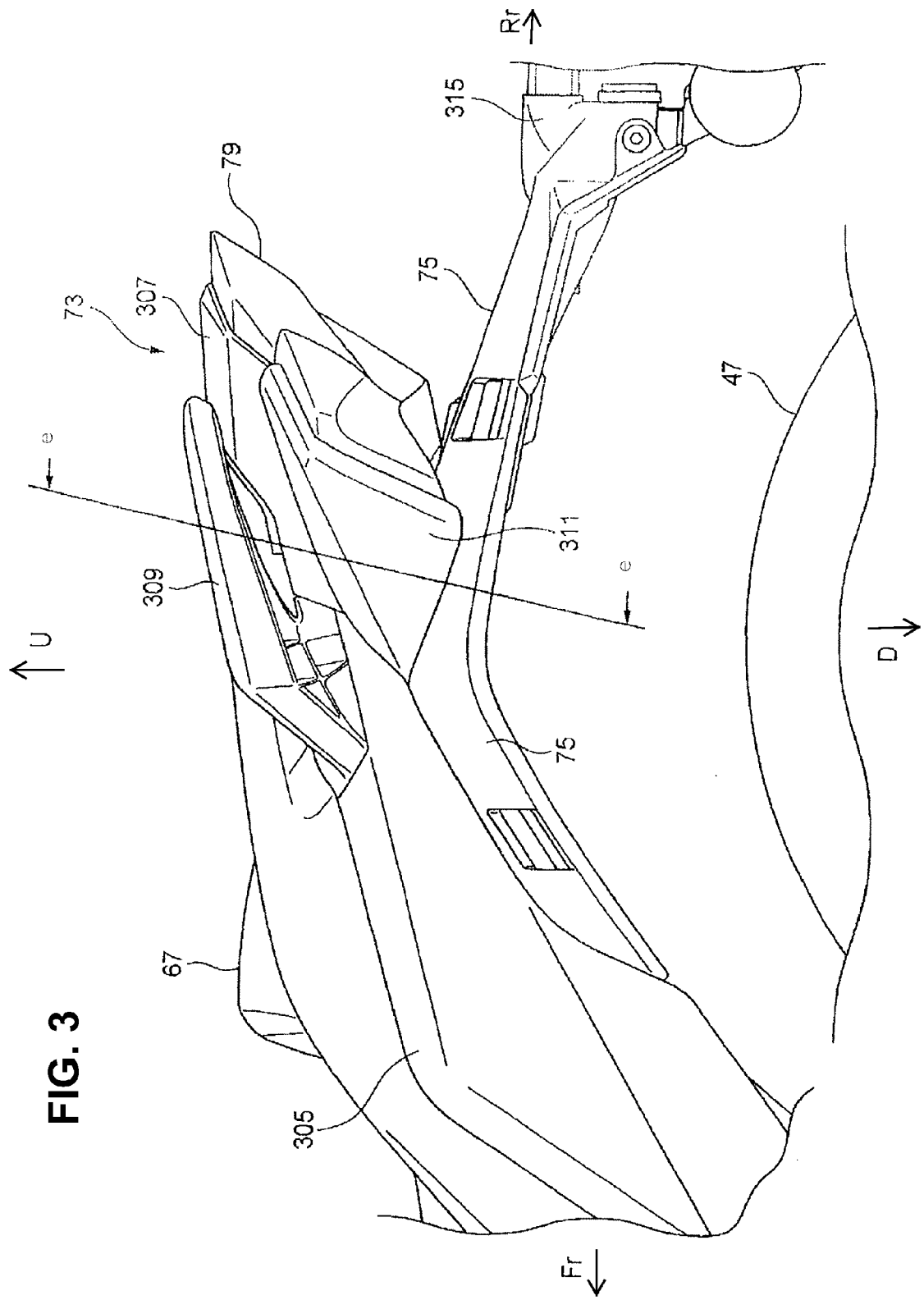
FIG. 3 is a detail side view of a left rear portion of the vehicle body according to an illustrative embodiment of the present invention.
Figure 4:
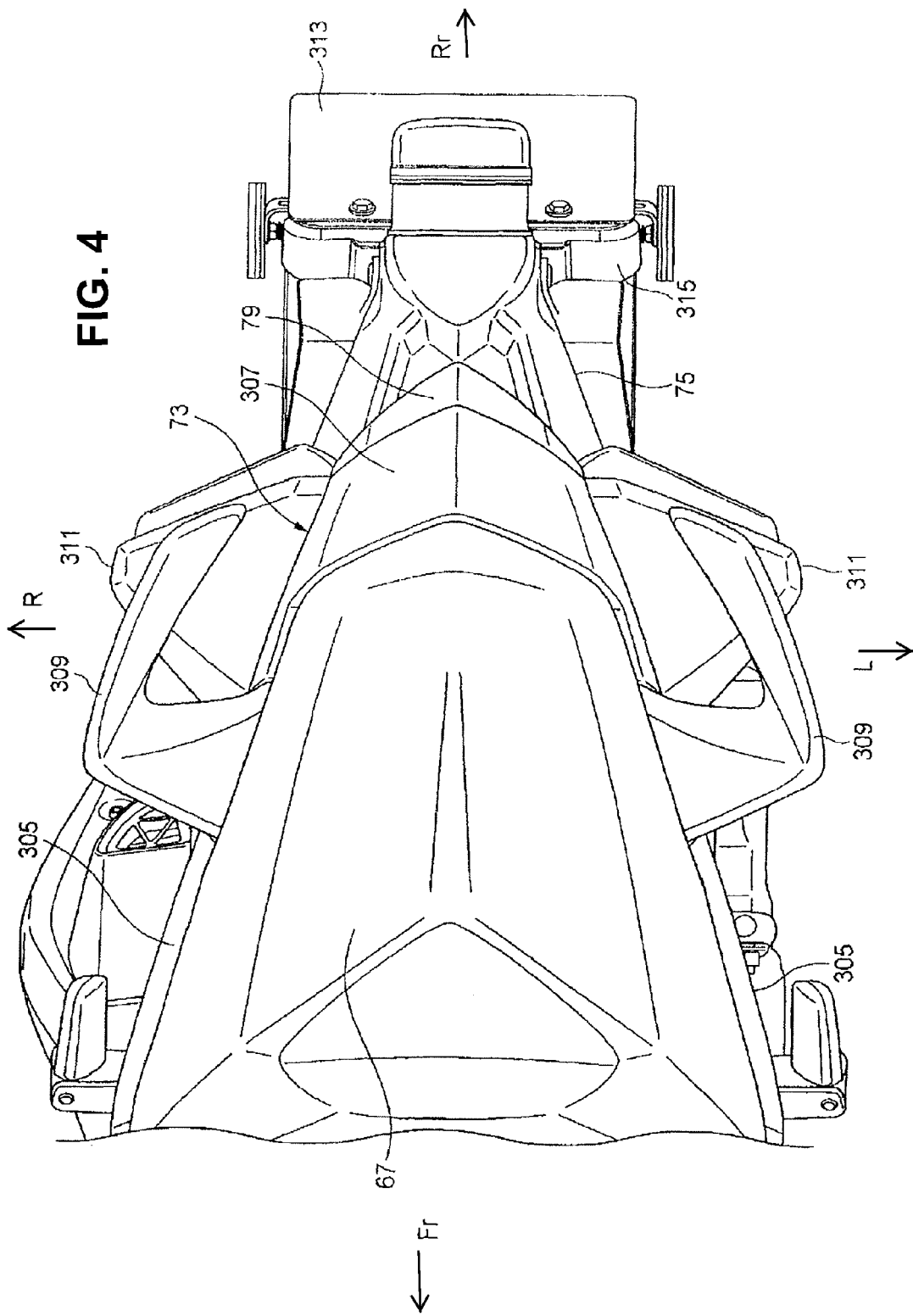
FIG. 4 is a detail top plan view of a pillion seat and a rear center cowl according to an illustrative embodiment of the present invention.
Figure 5:
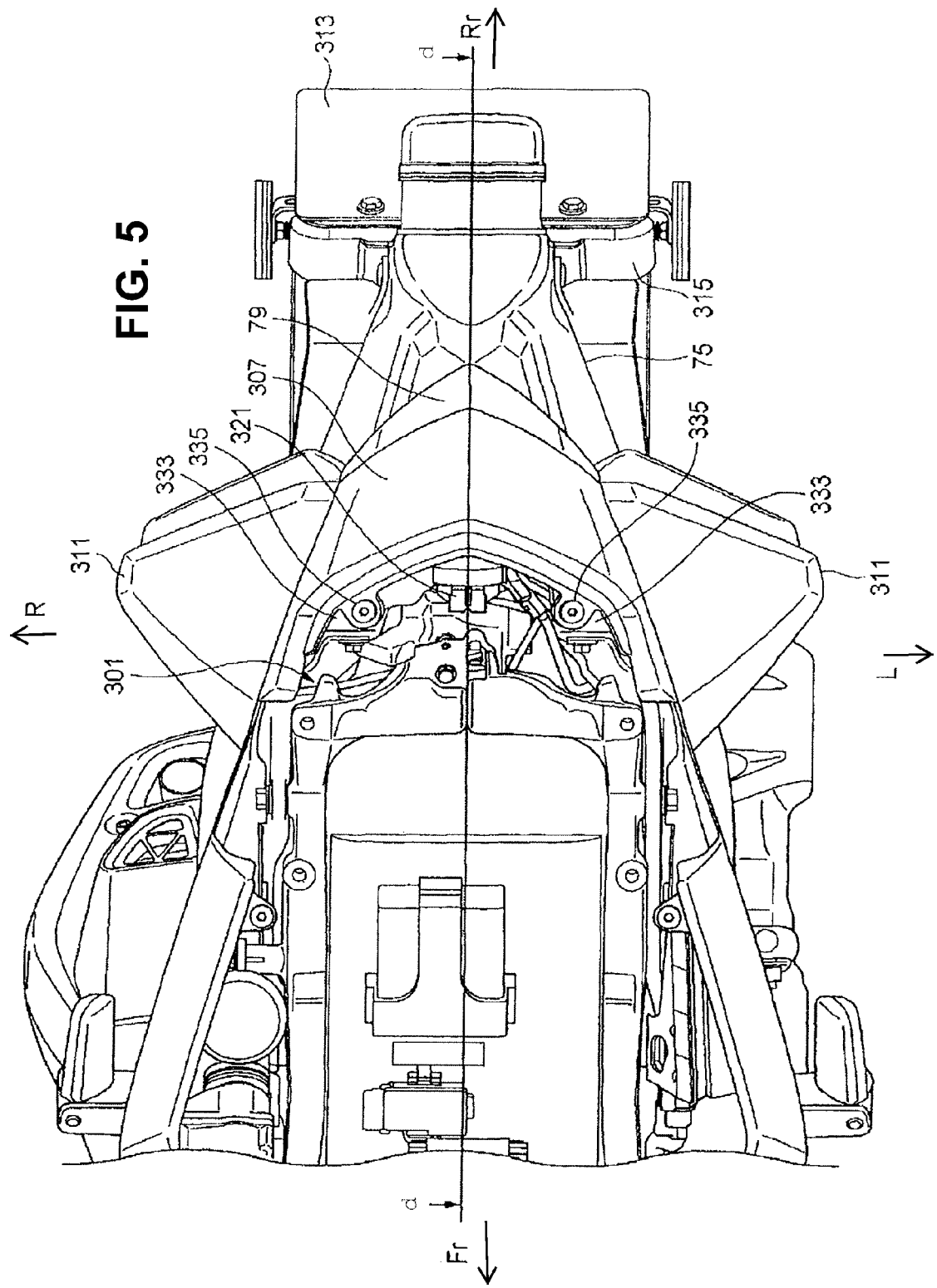
FIG. 5 is a detail top plan view of the rear center cowl according to an illustrative embodiment of the present invention in the condition where the pillion seat has been removed.

FIG. 1 is a right side view showing a basic configuration of a motorcycle 1, which is a saddle-type vehicle, according to an illustrative embodiment of the present invention, and FIG. 2 is a left side view of a vehicle body of the motorcycle 1.

A body frame 11 of the motorcycle 1 includes, as its main components: a head pipe 15 provided at a front end of the body frame 11 for steerably bearing a front fork 13, a left-right pair of main frames 17 extending rearwardly downwards from the head pipe 15, a left-right pair of intermediate frames 19 being continuous with the rear ends of the main frames 17 and extending vertically, and a left-right pair of seat rails 21 extending rearwardly upward from upper portions of the intermediate frames 19.

A front wheel 25 is rotatably supported on the lower ends of the front fork 13, a handle bar 27 is connected to the upper end of the front fork 13, and a front fender 29 covering the upper side of the front wheel 25 is supported by the front fork 13.

Disc brakes 101 and 103 shown in FIG. 1 are mounted to the front wheel 25 and a rear wheel 47 respectively. The disc brake 101 for the front wheel 25 has a brake disc 105 which is fixed to the front wheel 25 and which is rotated as one body with the front wheel 25, and a front caliper 107 which is mounted to the front fork 13. Similarly, the disc brake 103 for the rear wheel 47 has a brake disc 111 which is fixed to the rear wheel 47 and which is rotated as one body with the rear wheel 47, and a rear caliper 108. The front caliper 107 and rear caliper 108 each incorporate a left-right pair of friction pads which are moved toward and away from each other through a piston (not shown) by an oil pressure generated from a master cylinder (not shown). The friction pads clamp therebetween braking surfaces 109, 125 at both side surfaces of the brake discs 105, 111 to thereby apply a braking force to the front wheel 25 and the rear wheel 47.

A V-type water-cooled four-cylinder engine 31 is suspended from the main frames 17 and the intermediate frames 19 such that it is supported at first support parts 700A, second support parts 700B, third support parts 700C, and fourth support parts 700D shown in FIG. 2. Front-side cylinder exhaust pipes 35 are extended forwards from front-side cylinders 33 of the engine 31. The rear-side cylinder exhaust pipes 39 are bent in such a way that they extended rearward from the rear-side cylinders 37 of the engine 31, are then are turned to extended forward, and are turned again to extended rearward. The front-side cylinder exhaust pipes 35 and the rear-side cylinder exhaust pipes 39 are extended downward along a front surface of a crankcase 41 of the engine 31, and is located below the crankcase 41 by way of a catalyst chamber (CAT chamber) 43.

The catalyst chamber 43 is connected to a rear collecting pipe 45 through a collecting pipe. The rear collecting pipe 45 is disposed in a space formed between a lower portion of the crankcase 41 and the rear wheel 47, and is connected to a muffler 49 extending to the vehicle body right side of the rear wheel 47. The rear collecting pipe 45 is supported below the crankcase 41.

The muffler 49 is disposed such that it intersects, when viewed from the side, a swing arm 53 which supports the rear wheel 47 at a rear end portion thereof. The swing arm 53 has a front end portion supported by a pivot shaft 55 at a lower portion of the muffler 49 so as to be swingable in the vertical direction, and is suspended by a rear shock absorber (not shown) provided between the swing arm 53 and an upper end portion of a pivot plate (not shown). Step holders 407 having rider steps 403 are provided between the front wheel 25 and the rear wheel 47.

An output of the engine 31 is transmitted to the rear wheel 47 through a drive shaft 59. The drive shaft 59 is incorporated in the swing arm 53, which is disposed on the left side of the engine 31 as viewed from the rider facing toward the front side Fr of the motorcycle.

A fuel tank 63 supported on the main frames 17 is disposed above the engine 31. A main rider's seat (main seat) 65 is disposed behind the fuel tank 63, and is supported by the seat rails 21. A pillion seat 67 (passenger seat) is disposed behind the main seat 65.

A canister 201 is provided below a rear portion of the fuel tank 63. The canister 201 captures volatile fuel gases in the fuel tank 63, without permitting the gasses to leak to the exterior. The motorcycle 1 further includes a fuel tank lid 210, an oil feed port 212, a purge pipe 213, pillion step holders 81 provided on the left and right sides of the vehicle body, and pillion steps 83.

A radiator 69 is disposed in front of the engine 31. The front side of the head pipe 15 of the body frame 11 is covered with a front cowl 71, which may be made of synthetic resin. In addition, front portions of the main frames 17, the radiator 69, and front and lower portions of the engine 31 are covered, on both lateral sides thereof, by lower side cowls (not shown) continuous with the front cowl 71.

A rear cowl 73 for covering a lower portion of the body frame 11 and a rear fender 75 are mounted to rear portions of the body frame 11. The rear fender 75 is disposed below the rear cowl 73 and extends above the rear wheel 47. Further, the rear fender 75 is provided with a left-right pair of plate mounting brackets 315 for mounting a license plate 313.

A rear lamp assembly 79, including a left-right pair of turn signals 302 and a tail lamp 304 between the left and right turn signals 302, is disposed inside the rear cowl 73. The rear lamp assembly 79 is oriented such that that a rear portion thereof extends outwardly at the rear end of the rear cowl 73 so as to face rearwardly.

Referring now to FIGS. 3 through 7, the rear cowl 73, for covering the rear portion of the body frame 11, and the rear fender 75, disposed below the rear cowl 73 and above the rear wheel 47, are respectively mounted to rear portions of the body frame 11. The rear cowl 73 is mounted to the seat rails 21 so as to cover the rear portions of the body frame 11, specifically, rear portions of the seat rails 21 and a rear stay (not shown). The rear cowl 73 is provided with an opening 301 at its upper portion (see FIG. 5), which can be closed by the pillion seat 67. When it is closed, the pillion seat 67 is supported by the seat rails 21.

The rear cowl 73 includes a left-right pair of rear side cowl portions 305, 305 for covering the seat rails 21 on both lateral sides thereof, and a rear center cowl portion 307, which is a center cover fastened to upper portions of both the rear side cowl portions 305, 305 so as to cover the tail lamp 304 of the rear lamp assembly 79 above the tail lamp 304. The rear lamp assembly 79 has a structure in which the left-right pair of turn signals 302 (FIG. 1) and the tail lamp 304, between the left and right turn signals 302, are united together.

The opening 301 is defined by upper edge portions of both the rear side cowl portions 305, 305 and the rear center cowl portion 307. A left-right pair of grab rails 309, 309 fastened to the seat rails 21 are disposed at rear portions of the rear side cowl portions 305, 305. A pair of translucent turn signal covers 311, 311 are respectively mounted to the left and right sides of the rear center cowl portion 307. The turn signal covers 311, 311 are provided for covering the upper side of the turn signals 302 of the rear lamp assembly 79. The rear fender 75 is provided with the plate mounting parts 315 for mounting the license plate 313 thereon. The motorcycle 1 further includes a U-shaped lock 314 and a seat cover lock 316.

The motorcycle 1 according to the present illustrative embodiment provides the rear lamp assembly with a configuration in which maintenance of a rear lamp can be carried out easily, thereby overcoming the deficiencies of the prior art.

Referring to FIGS. 8 to 13, the rear lamp assembly 79 will now be described in further detail.

The rear lamp assembly 79 is mounted to a rear portion of the rear fender 75. As previously noted, the opening 301 in an upper portion of the rear cowl 73 can be closed with the pillion seat 67. The rear center cowl portion 307 covers the upper side of a tail lamp part of the rear lamp assembly 79. A rear portion of the rear lamp assembly 79 is disposed in rear portions of the rear side cowl portions 305, such that the rear lamp assembly 79 is exposed so as to be visible at the rear ends of the rear side cowl portions 305, and extends outwardly thereon so as to face rearwardly.

The rear lamp assembly 79 includes a tail lamp 317 (see FIG. 13) and a pair of turn signal lamps 319, 319 disposed therein. The tail lamp 317 has portions of a tail lamp socket 321 and a tail lamp reflector 323 exposed in, and accessible through the opening 301 (see FIGS. 6 and 7). Similarly, the turn signal lamp 319 has portions of turn signal sockets 325 exposed in, and accessible through the opening 301. The turn signal covers 311 cover the upper side of turn signal parts 327 (see FIG. 7) and turn signal sockets 325 in the rear lamp assembly 79.

A stay 331, formed at a rear reflective surface 329 (shown in FIG. 13) of the rear lamp assembly 79, is provided on the upper side in the rear lamp assembly 79. In addition, the turn signal cover 311 is provided, below the pillion seat 67, with an arm 333 extending toward the inner side in the vehicle width direction. The arm 333 of the turn signal cover 311 is fastened to the stay 331 of the rear lamp assembly 79 using, for example, a hexagon socket screw 335 (see also FIG. 8).

A left-right pair of fixing plates 337, 337 (see FIGS. 6 and 13) are provided at medial portions of the rear fender 75. The fixing plates 337, 337 are erected inside the opening 301. A left-right pair of fixing columns 339, 339 are provided on the rear reflective surface 329 of the rear lamp assembly 79, projecting toward the vehicle front. Each of the fixing columns 339, 339 has a female screw in its tip surface. An annular rubber grommet is fitted in a hole 336 (see FIG. 17) formed in an upper portion of each of the fixing plates 337, 337. The fixing column 339 is flexibly mounted to the fixing plate 337 by a bolt 343 passing through a collar 341 inserted through the rubber grommet 338.

Figure 11:
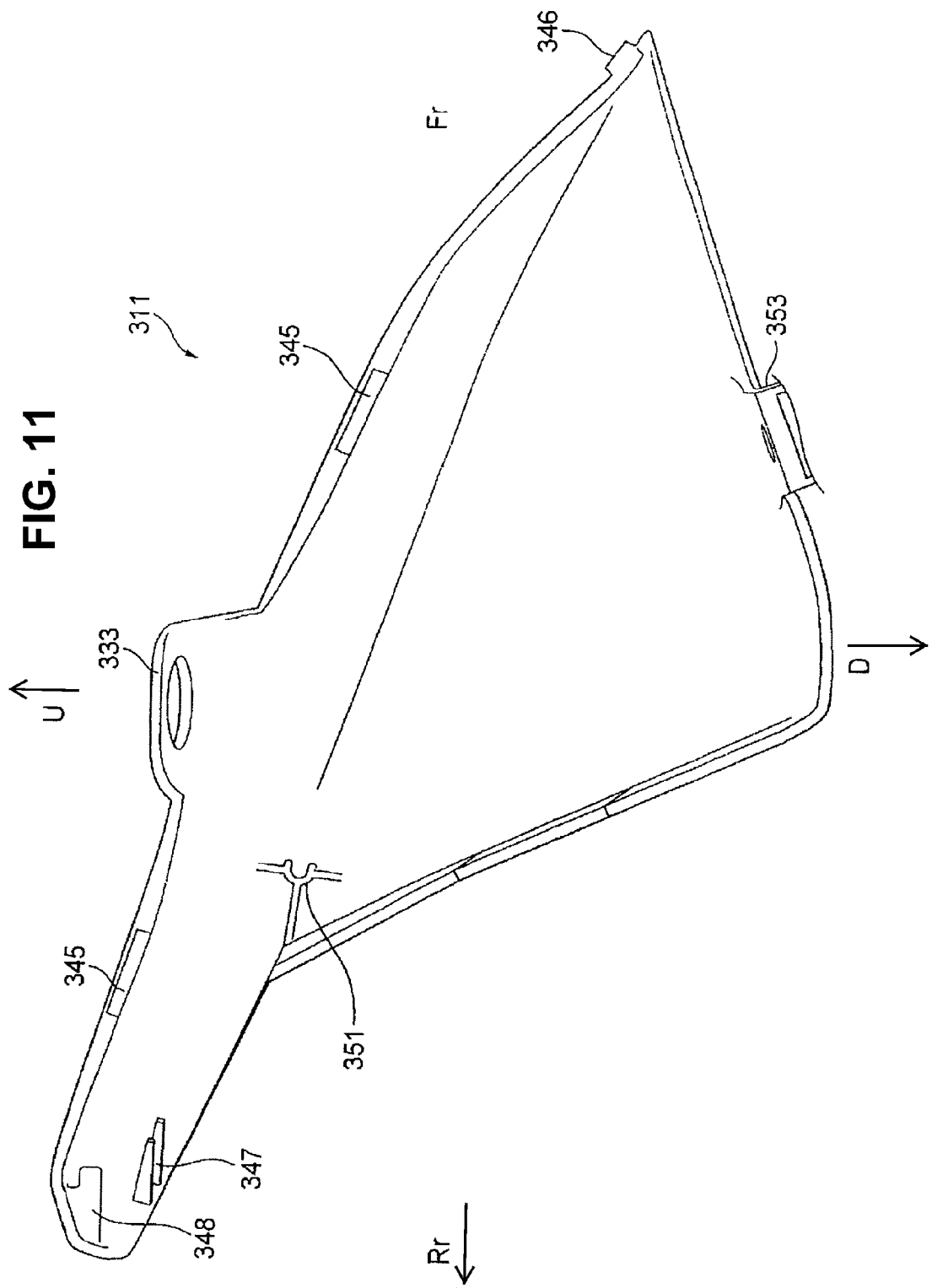
FIG. 11 is a detail side view of a right turn signal cover as viewed from the inner side according to an illustrative embodiment of the present invention.

As shown in FIG. 11, the turn signal cover 311, which may be made of a translucent resin material, is formed in a pyramidal bowl-like shape, which is roughly an inverted triangular shape when viewed from the side, and a central portion of which projects toward the back. At a central portion of the upper edge of the turn signal cover 311, the arm 333 projects toward the vehicle inner side. A pair of interlocking engagement fittings 345, 345 are provided respectively on the front and rear sides of the arm 333. A front interlocking engagement fitting 346 is formed at a front portion of the turn signal cover 311, and two rear interlocking engagement fittings 347, 347 are provided at a rear portion of the turn signal cover 311. In addition, the turn signal cover 311 is provided, at an inner surface of a rear portion thereof, with a projection 351 for engagement with a U-shaped groove 349 (see FIG. 10) provided in a side surface of the rear lamp assembly 79.

Figure 12:
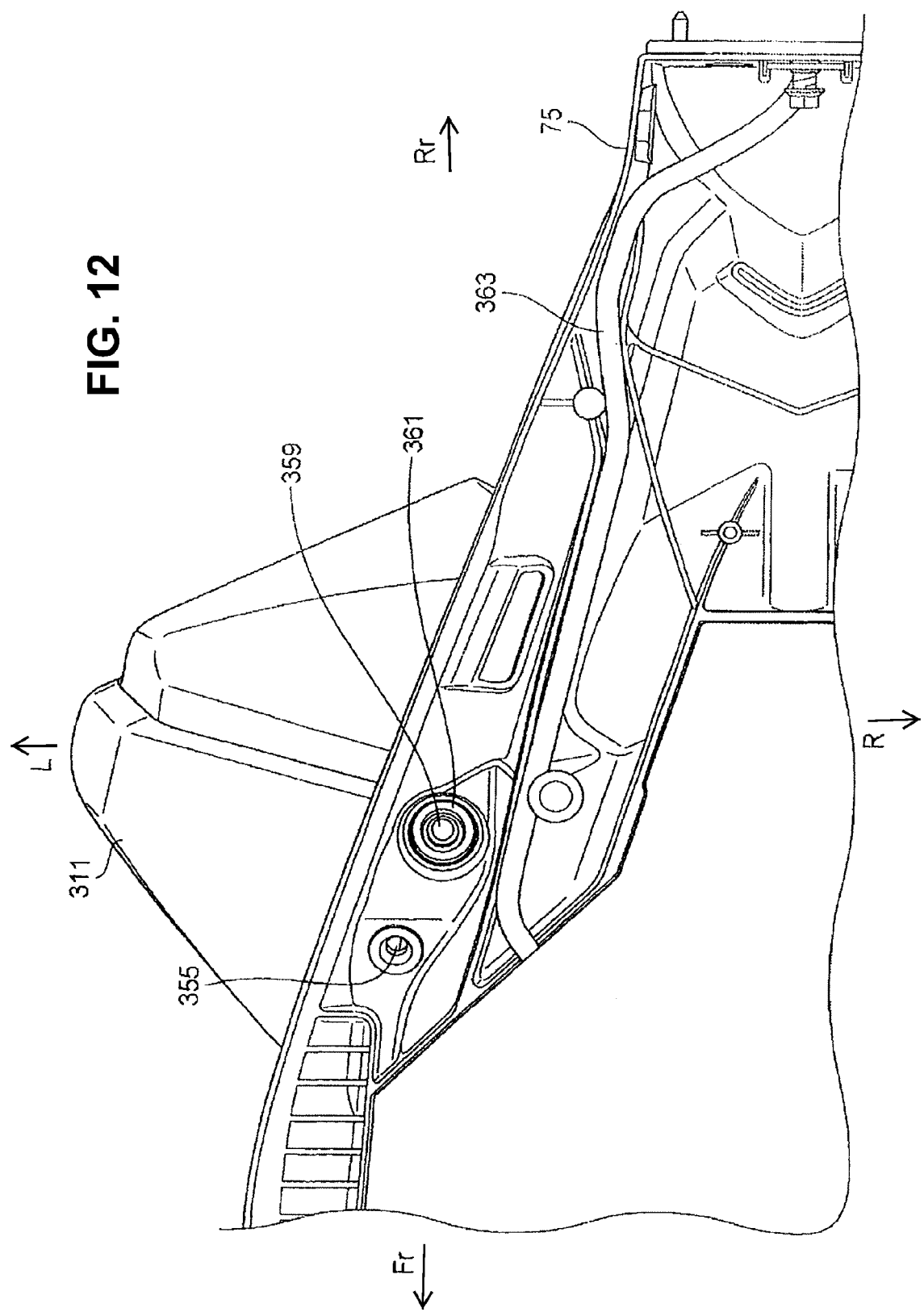
FIG. 12 is a detail bottom view of a left turn signal cover as viewed from the lower side of a rear fender according to an illustrative embodiment of the present invention.

In addition, the turn signal cover 311 is provided at its lower portion with a fixing hole 353, and the fixing hole 353 is attached to the rear fender 75 by a screw 355 from the lower side, as shown in FIG. 12. The upper portion of the turn signal cover 311 is fixed to the stay 331 through the arm 333, and the lower portion of the turn signal cover 311 is fixed to the rear fender 75, whereby fixation rigidity of the turn signal cover 311 is enhanced. The motorcycle 1 further includes bolt 359 for fixing the rear lamp assembly 79 from the lower side of the rear fender 75 by way of a rubber mount 361, and a harness 363 for a license plate bulb (not shown).

The rear center cowl portion 307 is formed with a fixing seat 357 at a position for overlapping with the arm 333 on the upper side. The fixing seat 357 is fixed to the stay 331, with the arm 333 therebetween, by the hexagon socket screw 335. In other words, the fixing seat 357, the arm 333, and the stay 331 are fastened together. With the stay 331 formed at the rear reflective surface 329 of the rear lamp assembly 79, the turn signal cover 311 and the rear center cowl portion 307 can both be fixed to the same location.

Since the arm 333 provided as part of the turn signal cover 311 and extending toward the inner side in the vehicle width direction is fastened to the stay 331 of the rear lamp assembly 79, release of the fastening of the arm 333 makes it possible to remove only the turn signal cover 311. Removal of the turn signal cover 311 ensures that the turn signal socket 325 is exposed so as to enable easy replacement of a light bulb, without need to remove the rear lamp as a whole as in conventional structures.

Figure 13:
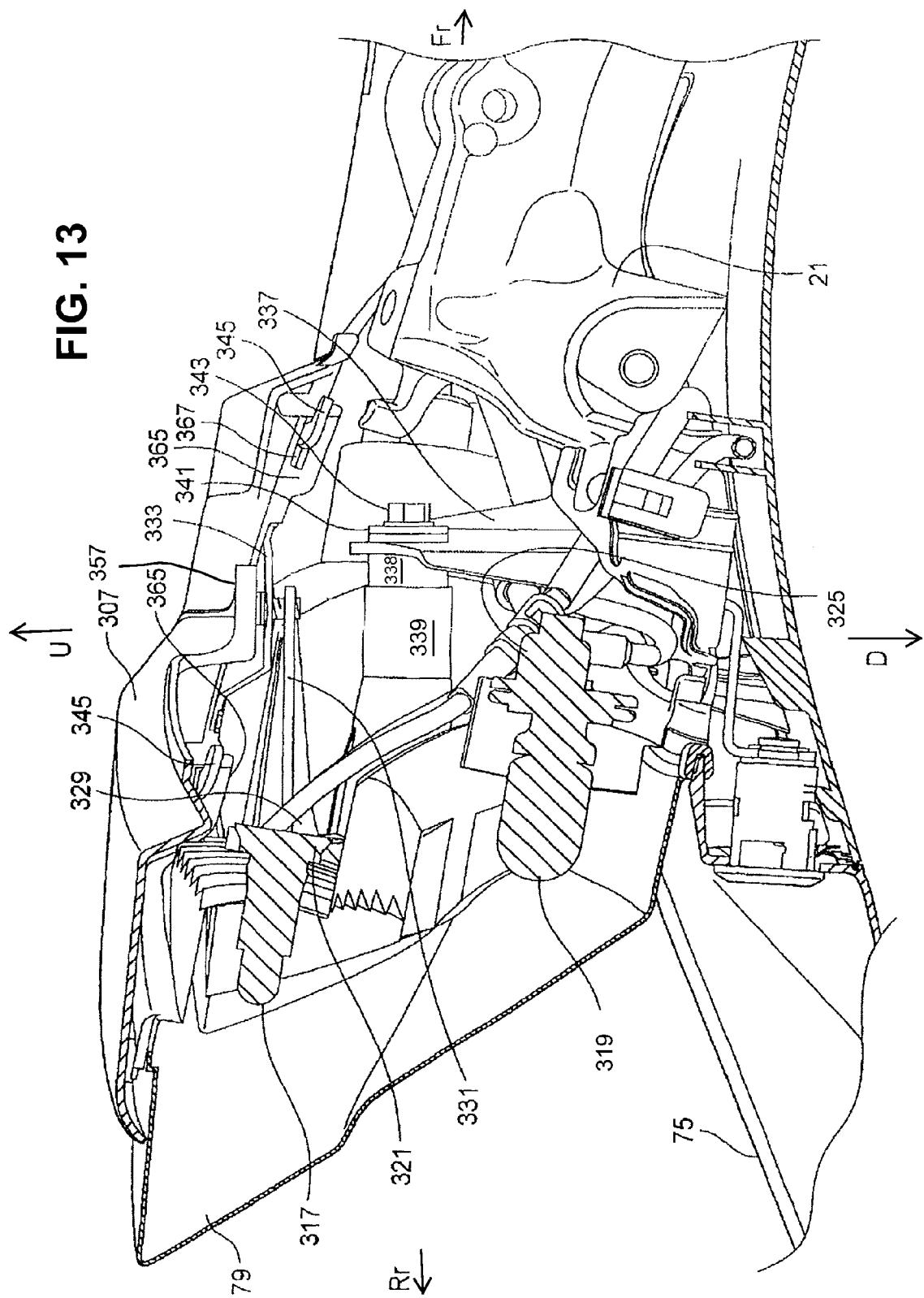
FIG. 13 is a cross-sectional view of the rear cowl, taken along the line d-d of FIG. 5.
Figure 14:
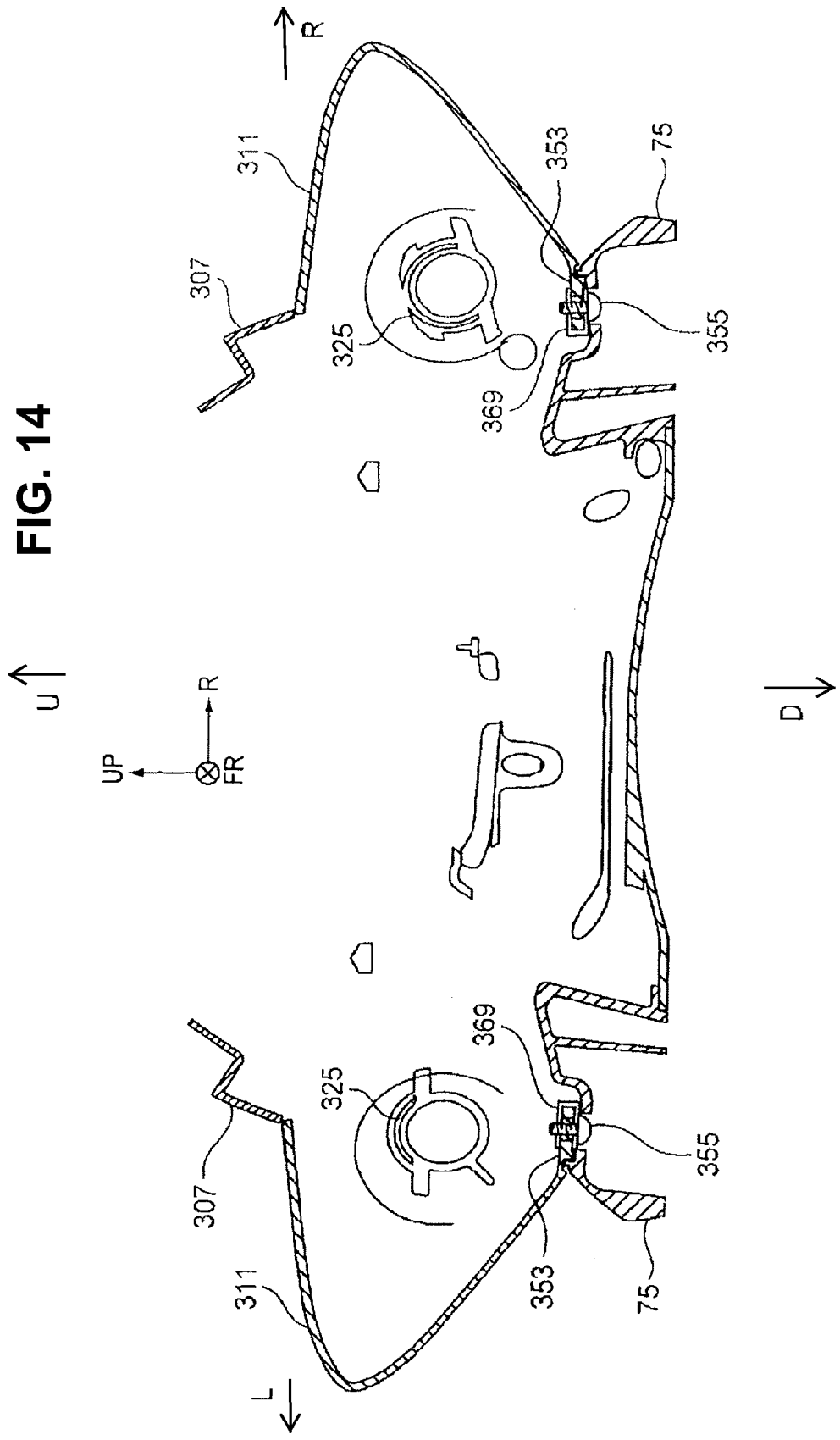
FIG. 14 is a cross-sectional view of the left rear portion of the vehicle body, taken along the line e-e of FIG. 3.

As shown in FIG. 13, the rear center cowl portion 307 is provided at its side portions with ribs 365, 365 extending downwardly. The ribs 365, 365 are provided with slits 367, and the side interlocking members 345, 345 of the turn signal covers 311 are locked in the slits 367. The side interlocking members 345, 345 of the turn signal covers 311 are slidingly locked in the slits 367, along the vehicle front-rear direction, in the ribs 365, 365 provided on the rear center cowl portion 307, whereby movement (backlash) of the turn signal covers 311 in the slit width direction (vehicle up-down direction) is restricted. In addition, even after the fastening of the arm 333 to the stay 331 is released, the turn signal cover 311 remains tentatively fixed to the rear center cowl portion 307 due to the engagement between the slit 367 and the side interlocking member 345.

The fixing hole part 353 of the turn signal cover 311 fixed to the rear fender 75 by a screw 355, for example, is fixed through a clip nut 369 which is angular U-shaped in section.

Figure 15:
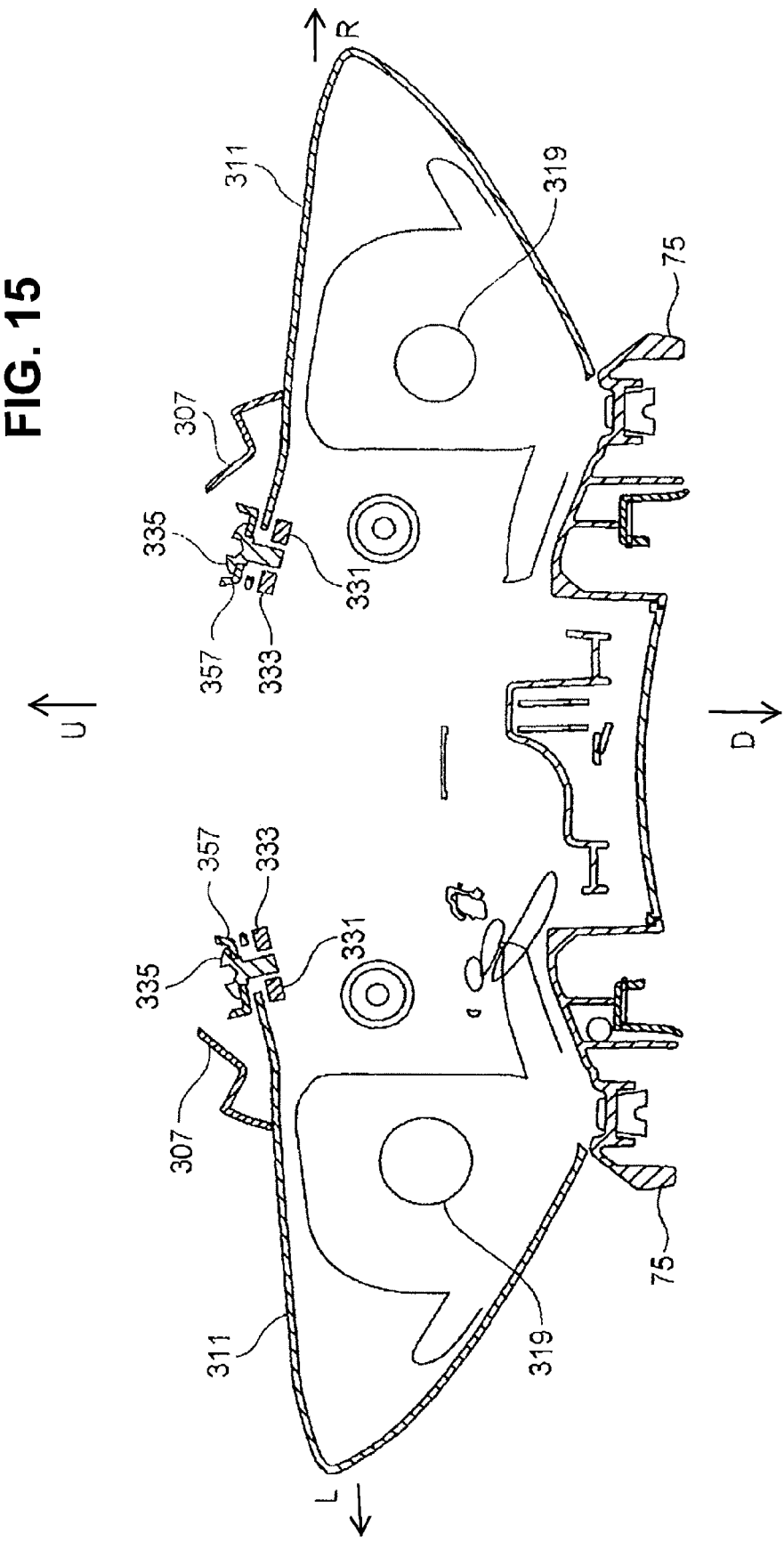
FIG. 15 is a cross-sectional view of the fastener of the rear center cowl, taken along the line f-f of FIG. 8.

The turn signal cover 311 is provided with the fixing hole part 353 at a lower portion thereof, and the fixing hole part 353 is fixed to the rear fender 75 from the lower side by the screw 355, as shown in FIG. 12. The arm 333 of the turn signal cover 311 shown in FIG. 15 is fixed in a clamped state between the stay 331 and the fixing seat 357.

Figure 16:
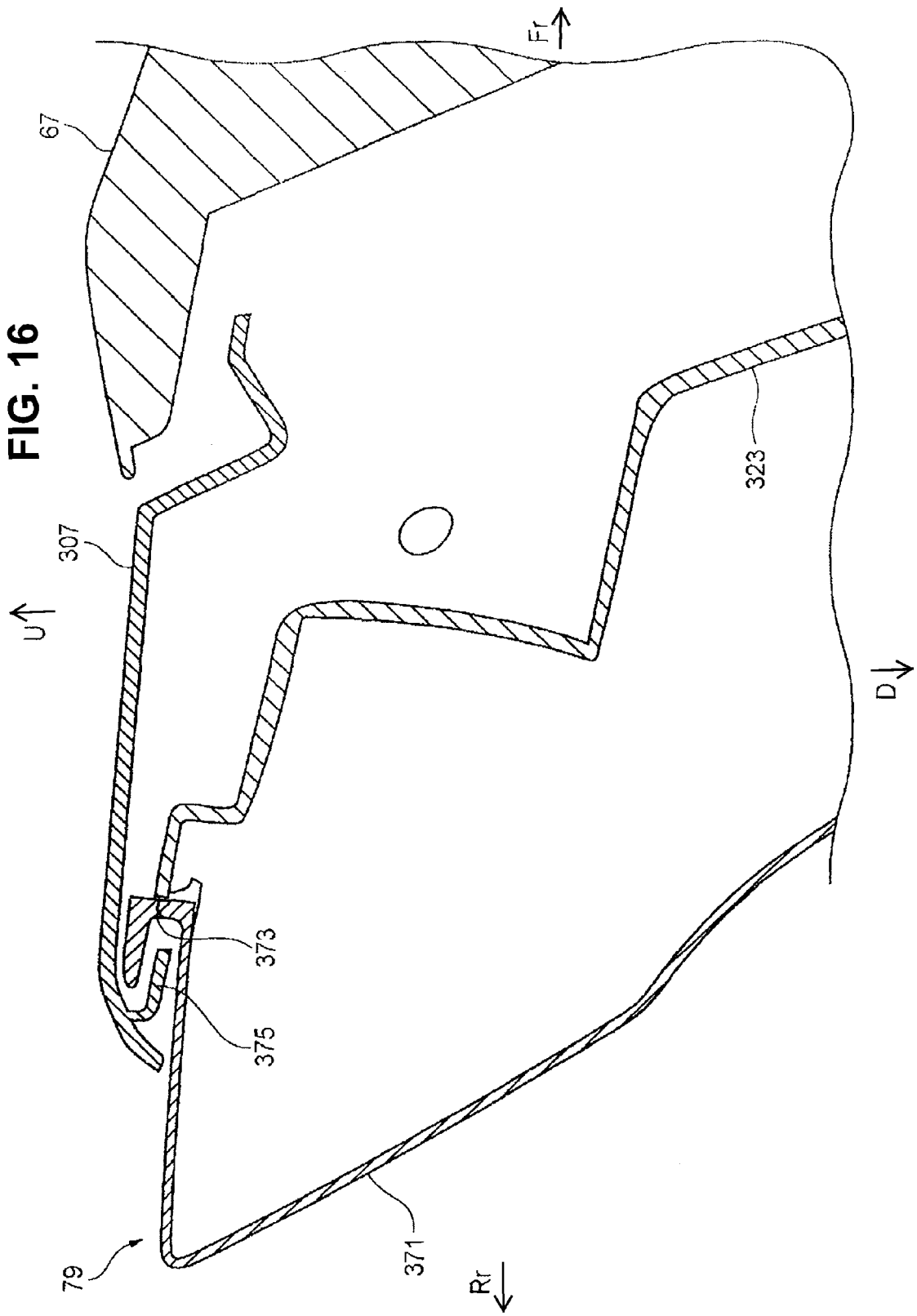
FIG. 16 is a cross-sectional view of the rear portion of a vehicle body, taken along the line g-g of FIG. 9.
Figure 17:
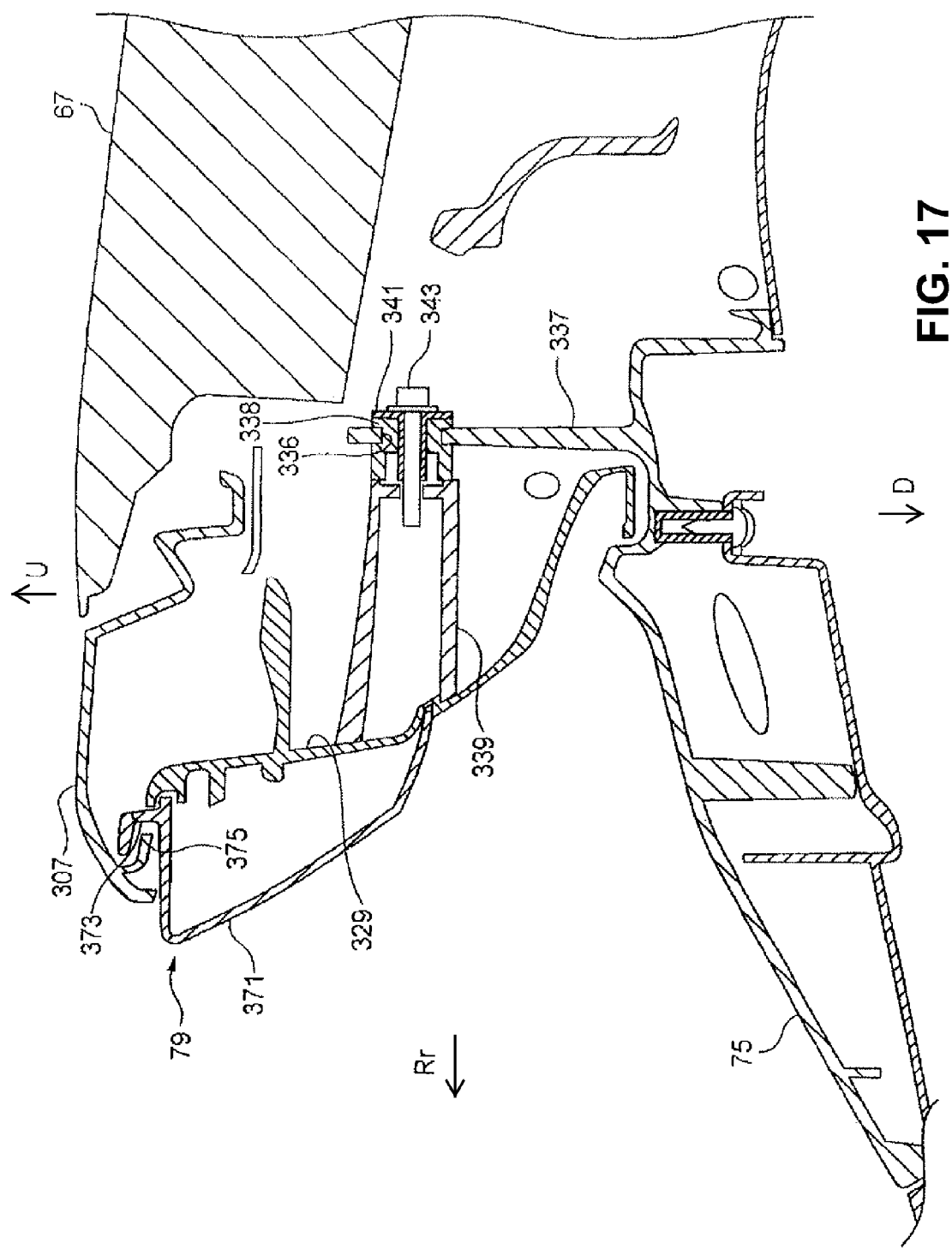
FIG. 17 is a cross-sectional view of the rear portion of a vehicle body, taken along the line h-h of FIG. 9.
Figure 19:
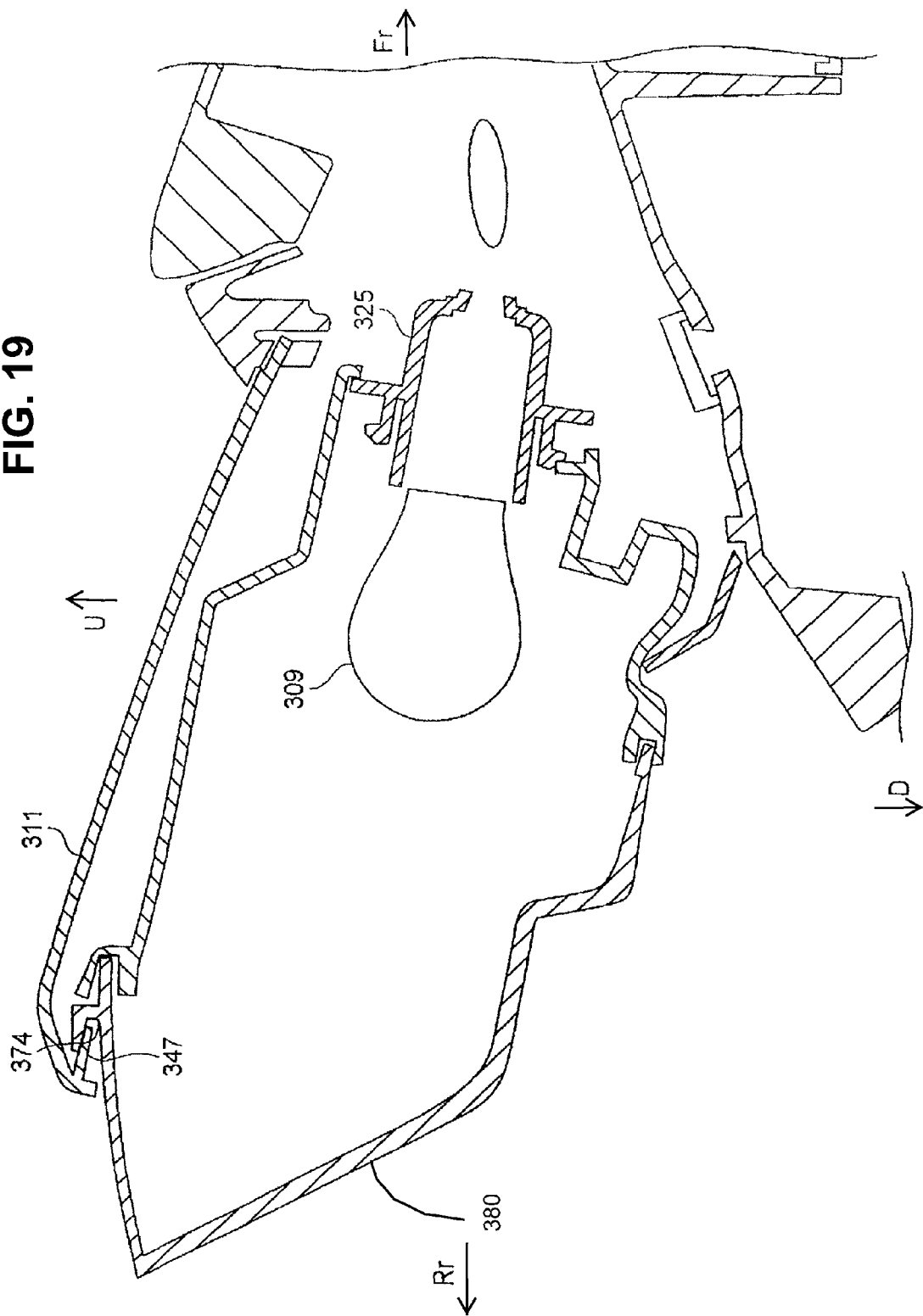
FIG. 19 is a cross-sectional view of the rear portion of a vehicle body, taken along the line j-j of FIG. 9.

As shown in FIGS. 16 and 17, the rear center cowl portion 307 is provided at the lower surface of a rear portion thereof with a rear interlocking engagement 375 for engagement with a recess 373 provided in the upper surface of a tail lens 371 of the rear lamp assembly 79. As shown in FIG. 19, the turn signal cover 311 is provided at its rear portion with a rear interlocking engagement 347 for engagement with a recess 374 provided in the upper surface of a turn signal lens 380. Thus, rear portions of the turn signal covers 311 and the rear center cowl portion 307 are engaged with and fixed to the rear lamp assembly 79 by the interlocking engagements 375, 347 and the recess 373 and the recesses 374. This ensures that the gaps between the rear lamp assembly 79 and the turn signal covers 311 as well as the rear center cowl portion 307 can be minimized as compared with a fixing structure in which fastening members are used and further movement of the turn signal covers and the rear center cowl can be minimized.

Figure 18:
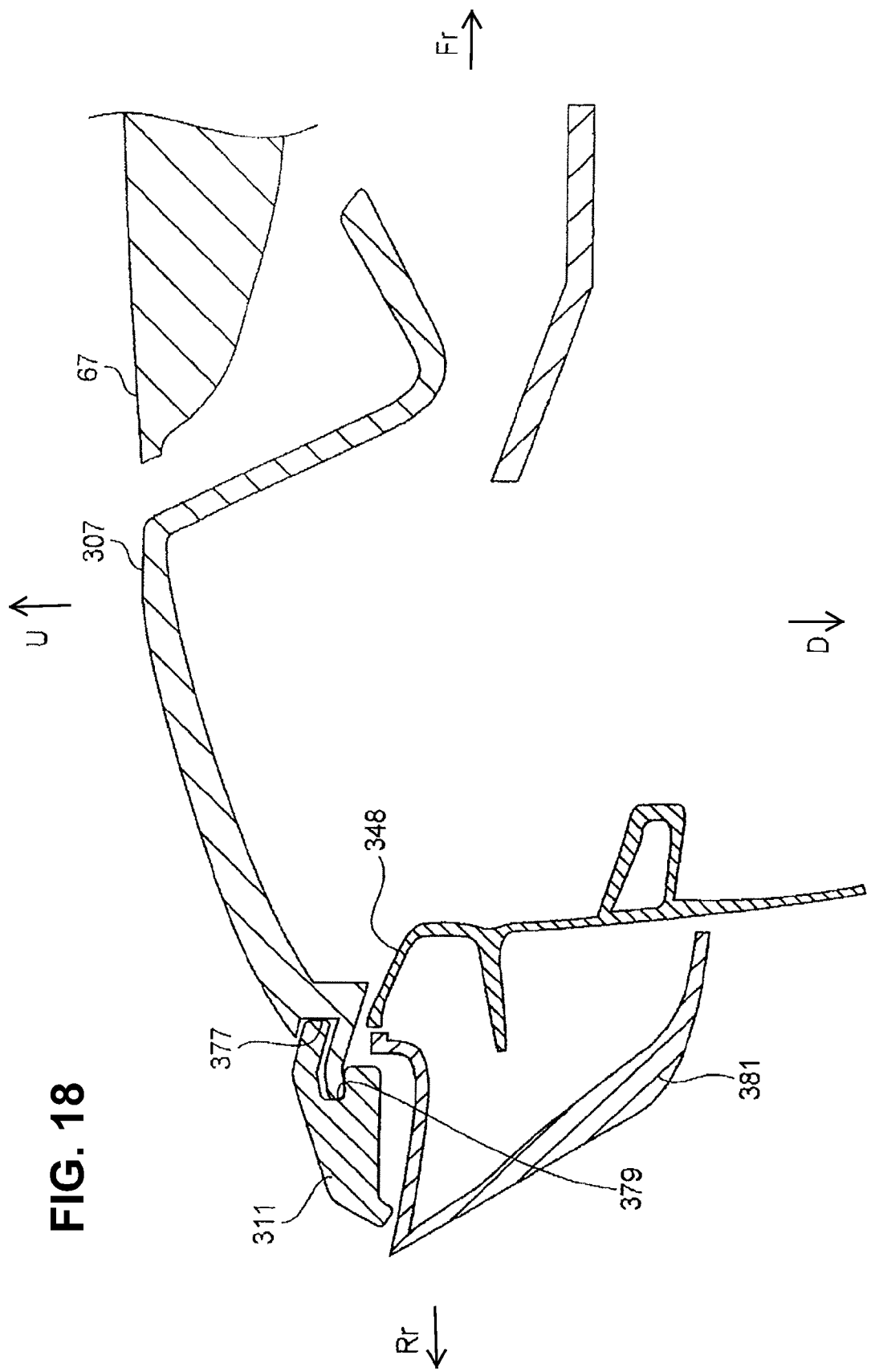
FIG. 18 is a cross-sectional view of the rear portion of a vehicle body, taken along the line i-i of FIG. 9.

As shown in FIG. 18, the rear center cowl portion 307 is provided at its rear portions with first recesses 377 for engagement with rear portions of the inner side edges of the turn signal covers 311. The turn signal cover 311 is provided at a rear portion of the lower surface thereof with a second recess 379 which is for engagement with the rear edge of the rear center cowl portion 307 and which is formed by the upper surface of the rear center cowl portion 307 and a rear interlocking engagement 348. The first recess 377, provided at the rear portion of the rear center cowl portion 307 so as to face rearwards, is fitted with the second recess 379, provided at the rear portion of each turn signal cover 311, so as to face forward, whereby the rear portions of the rear center cowl portion 307 are engaged with the rear portions of the turn signal covers 311 through projection-recess engagement. An upper portion of a turn signal 381 is covered with the turn signal cover 311.

Figure 20:
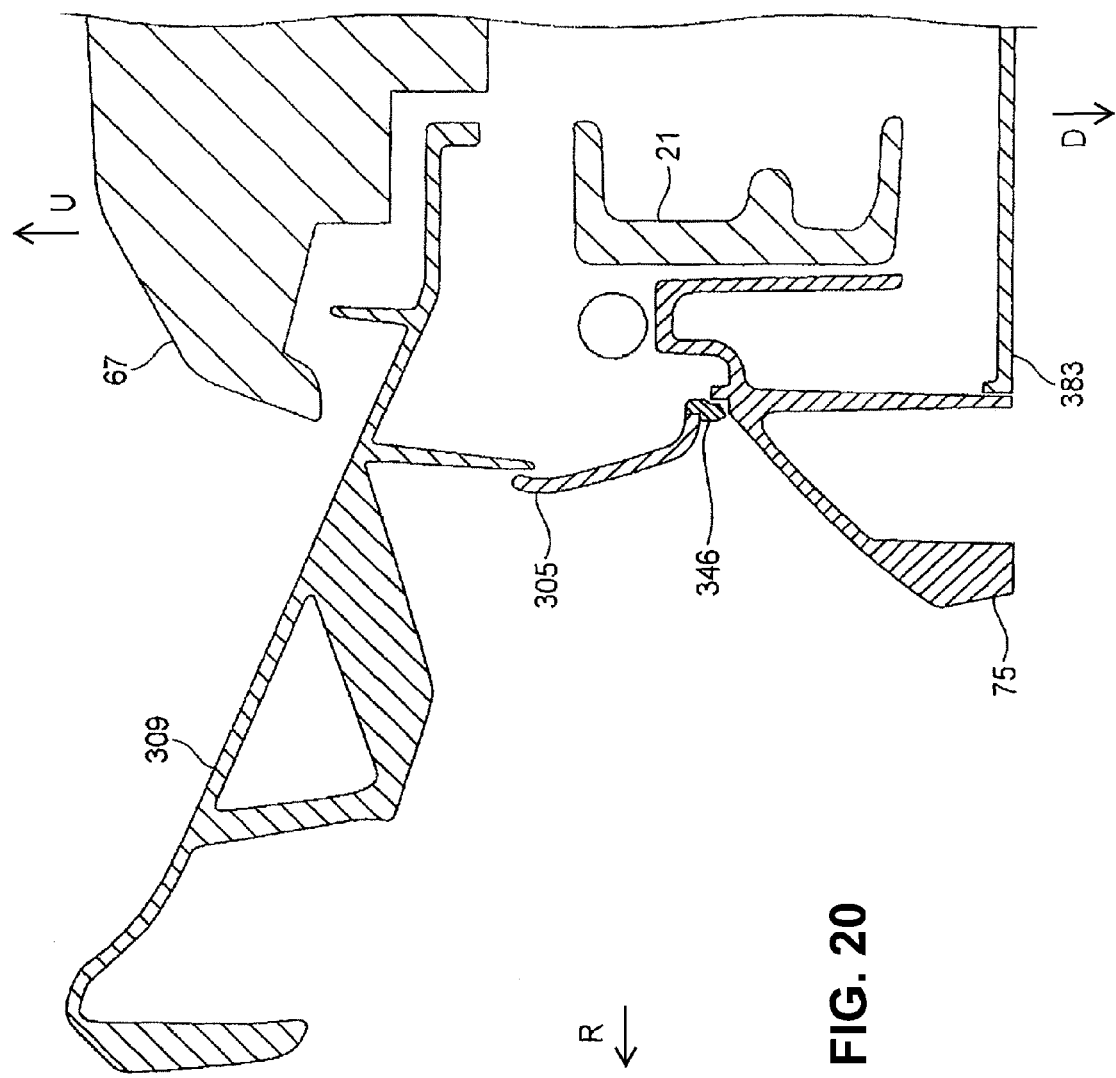
FIG. 20 is a cross-sectional view of the rear portion of a vehicle body, taken along the line k-k of FIG. 10.
Figure 21:
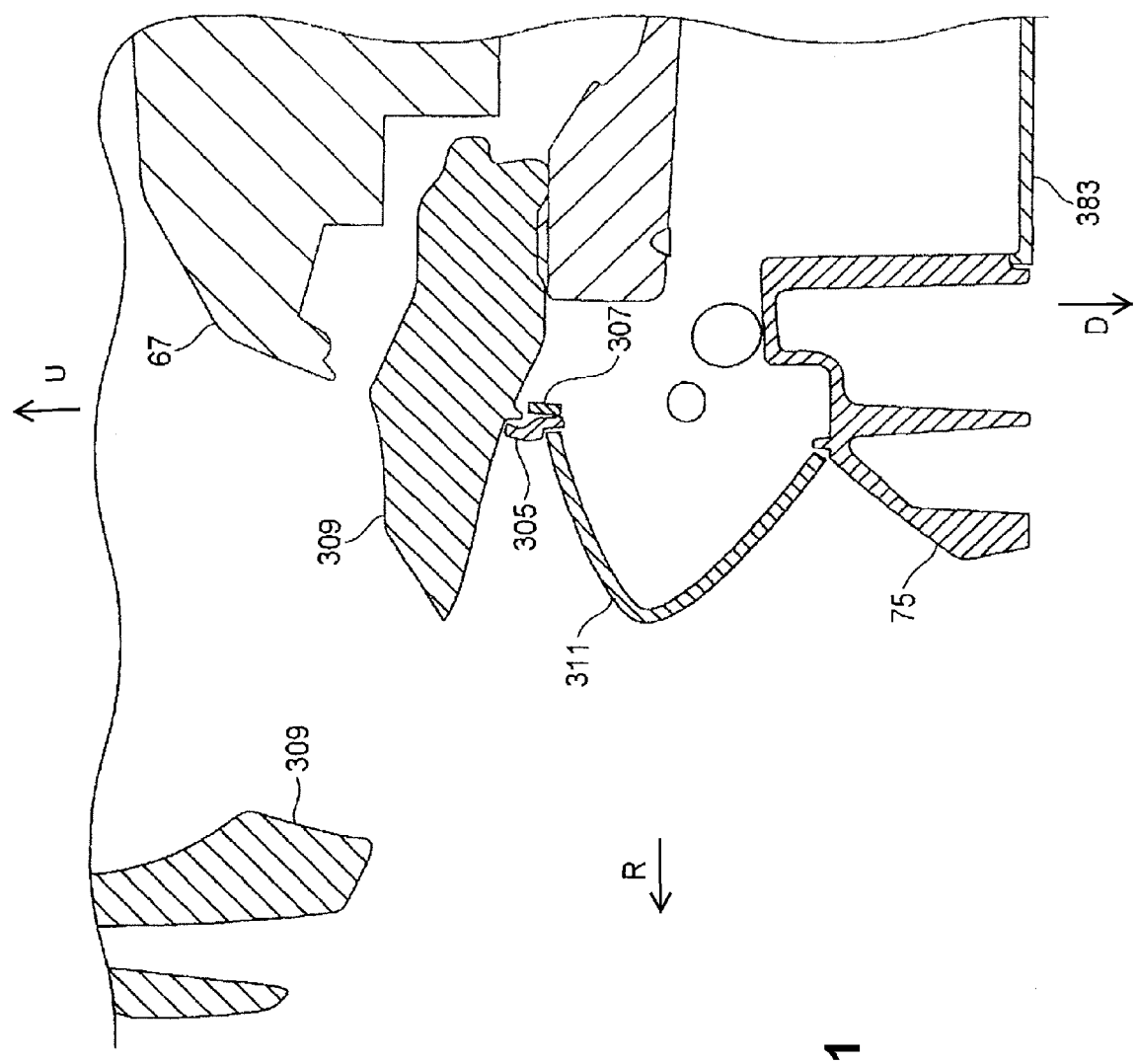
FIG. 21 is a cross-sectional view of the vehicle body, taken along the line l-l of FIG. 10.

As shown in FIG. 20, the rear side cowl portions 305, 305 for covering the gaps between the grab rails 309 and the rear fender 75 are mounted to lower portions of the grab rails 309. An inner fender 383 is disposed on the inner side of the rear fender 75, and the inner fender 383 covers the lower side of the seat rails 21. A front interlocking member 346 of the turn signal cover 311 is locked to the inner side of the rear side cowl 305. As shown in FIG. 21, the rear ends of the rear side cowl portions 305, 305 are each clamped between the turn signal cover 311 and the rear center cowl portion 307.

Figure 22:
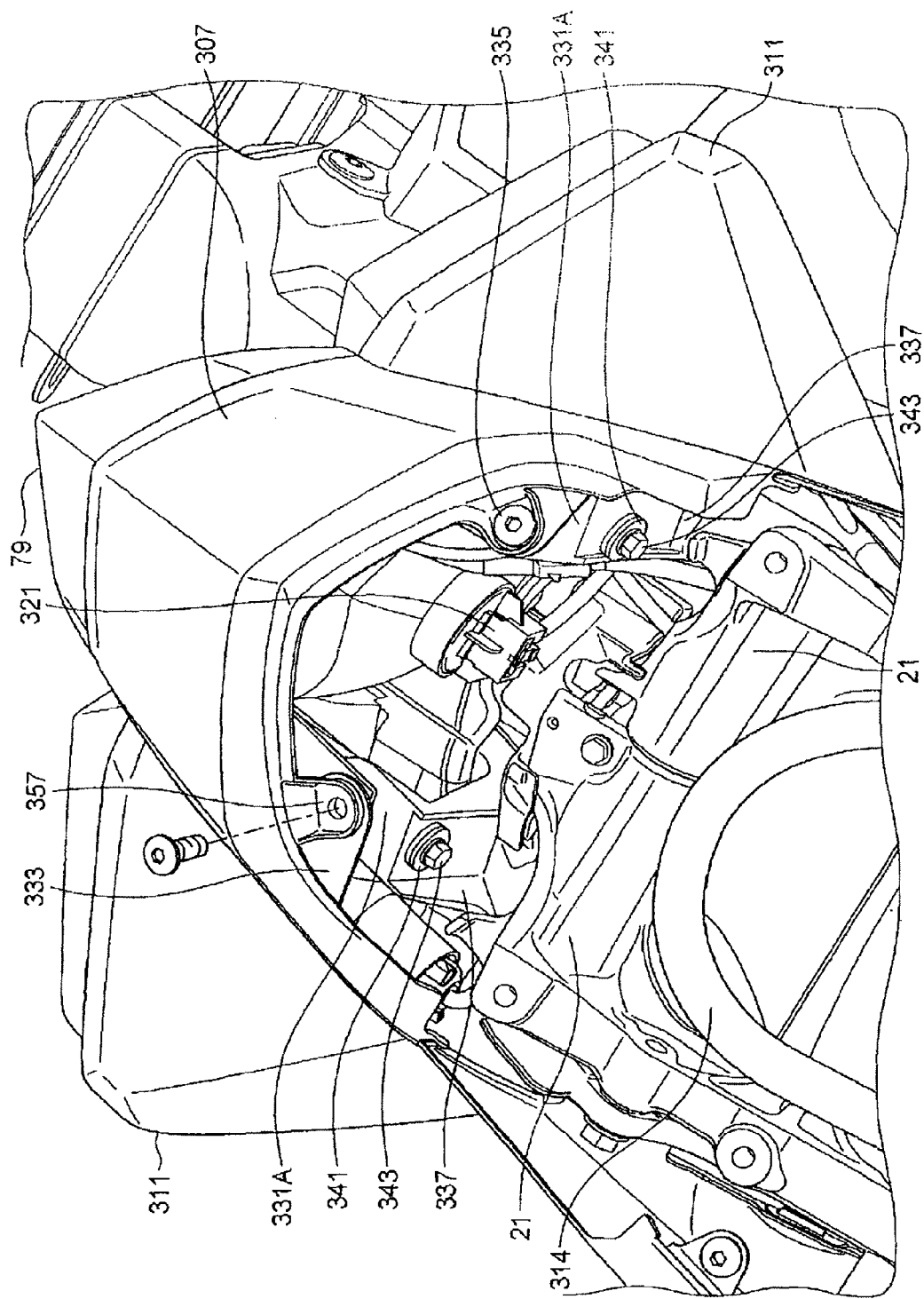
FIG. 22 is a perspective view pertaining to a modification in which the rear fender is formed with a stay.

FIG. 22 is a perspective view of a modification of the present illustrative embodiment in which a rear fender is formed with a stay.

Figure 6:
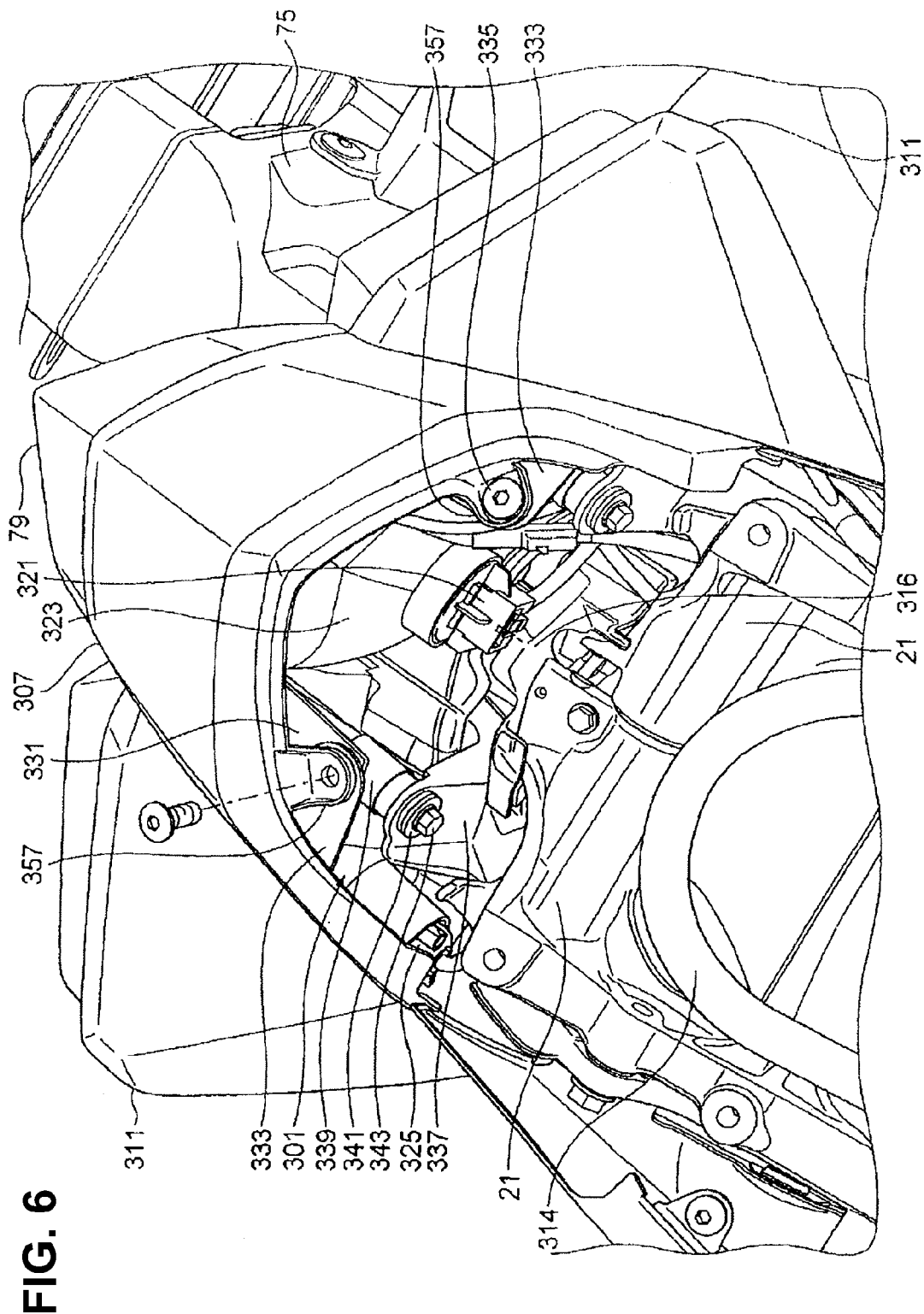
FIG. 6 is a perspective view of an opening in a rear center cowl according to an illustrative embodiment of the present invention.
Figure 7:
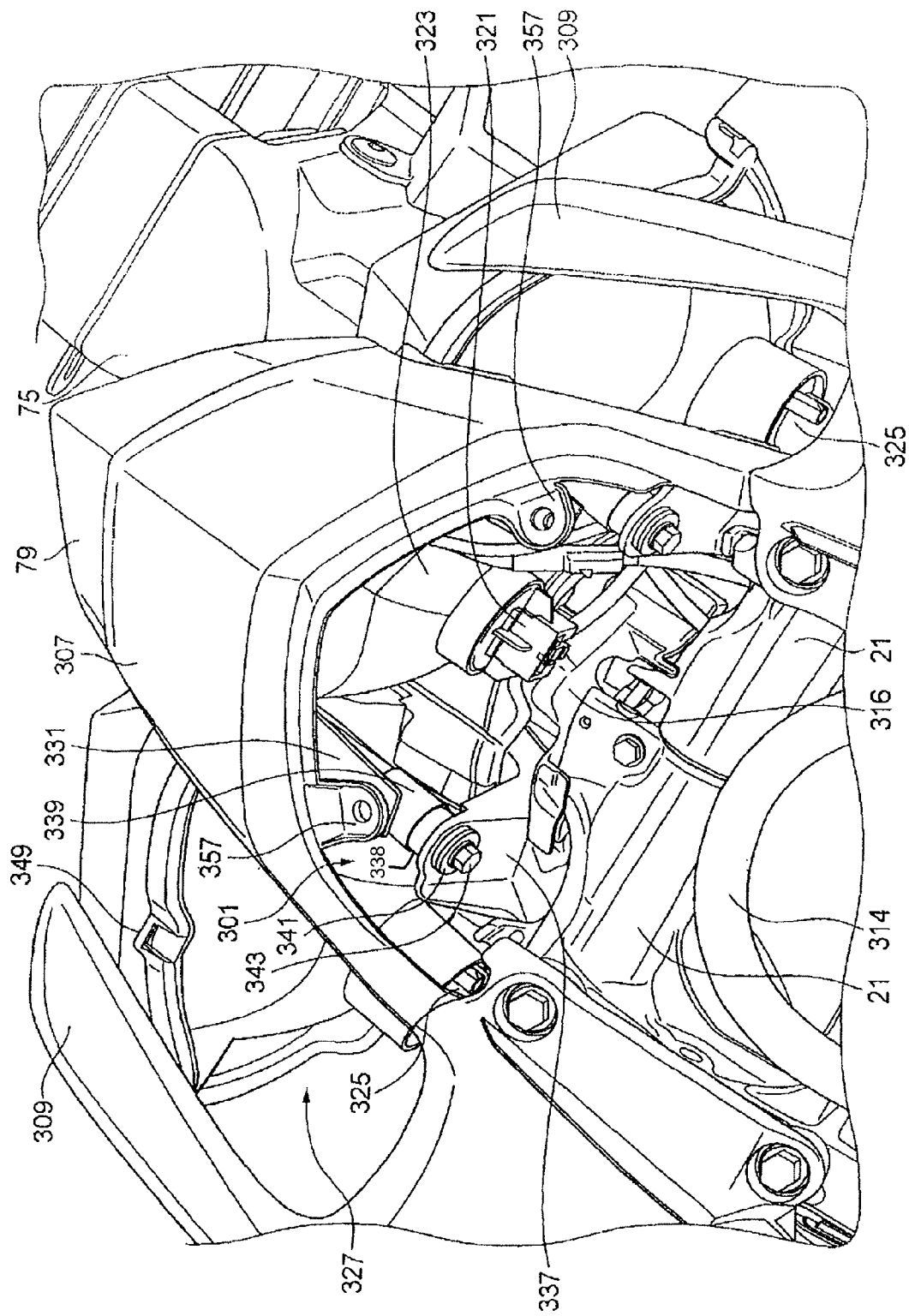
FIG. 7 is a perspective view showing a case where rear turn signal covers have been removed from the case shown in FIG. 6.
Figure 8:
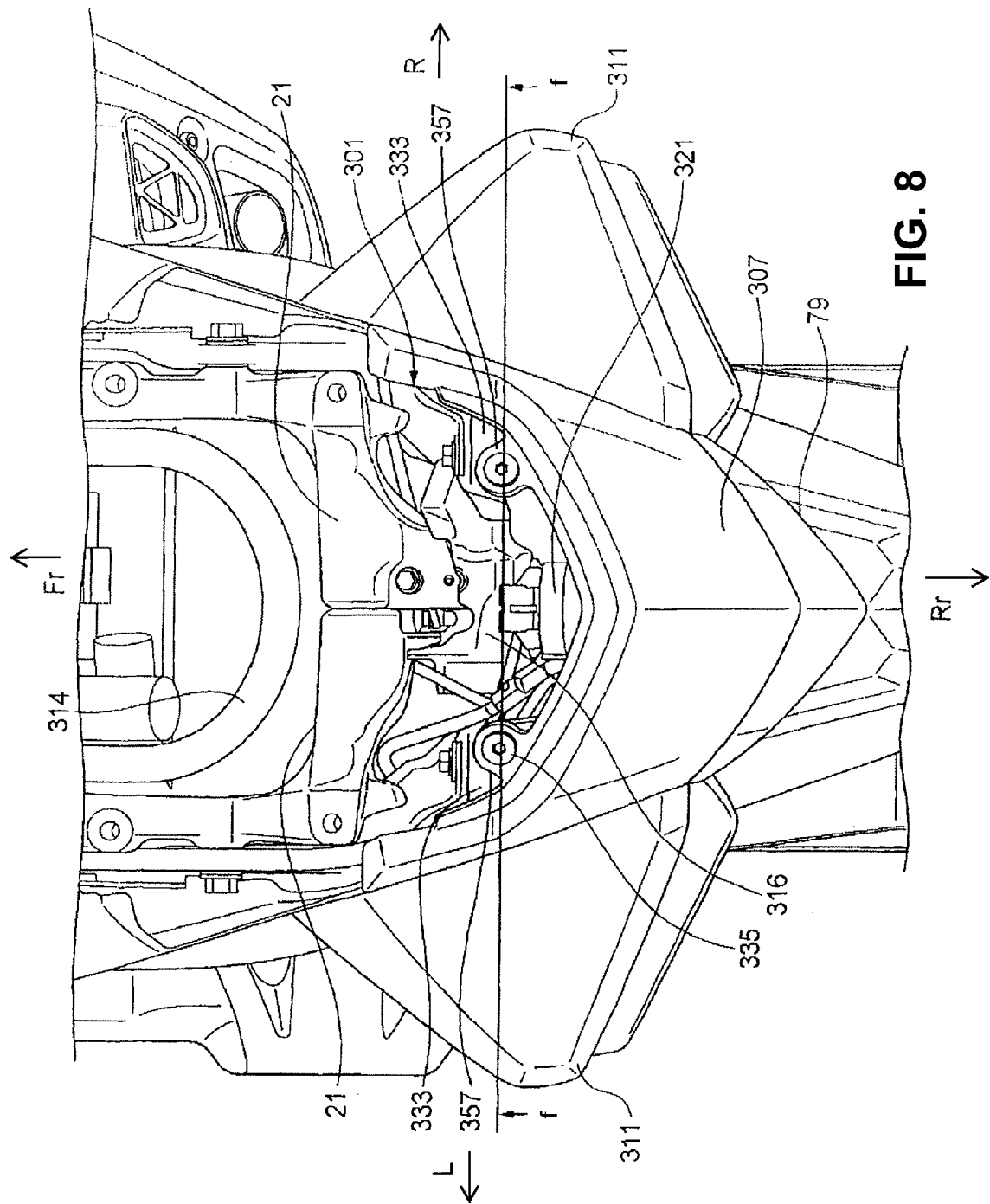
FIG. 8 is a detail top plan view of a fastener of the rear center cowl according to an illustrative embodiment of the present invention.
Figure 9:
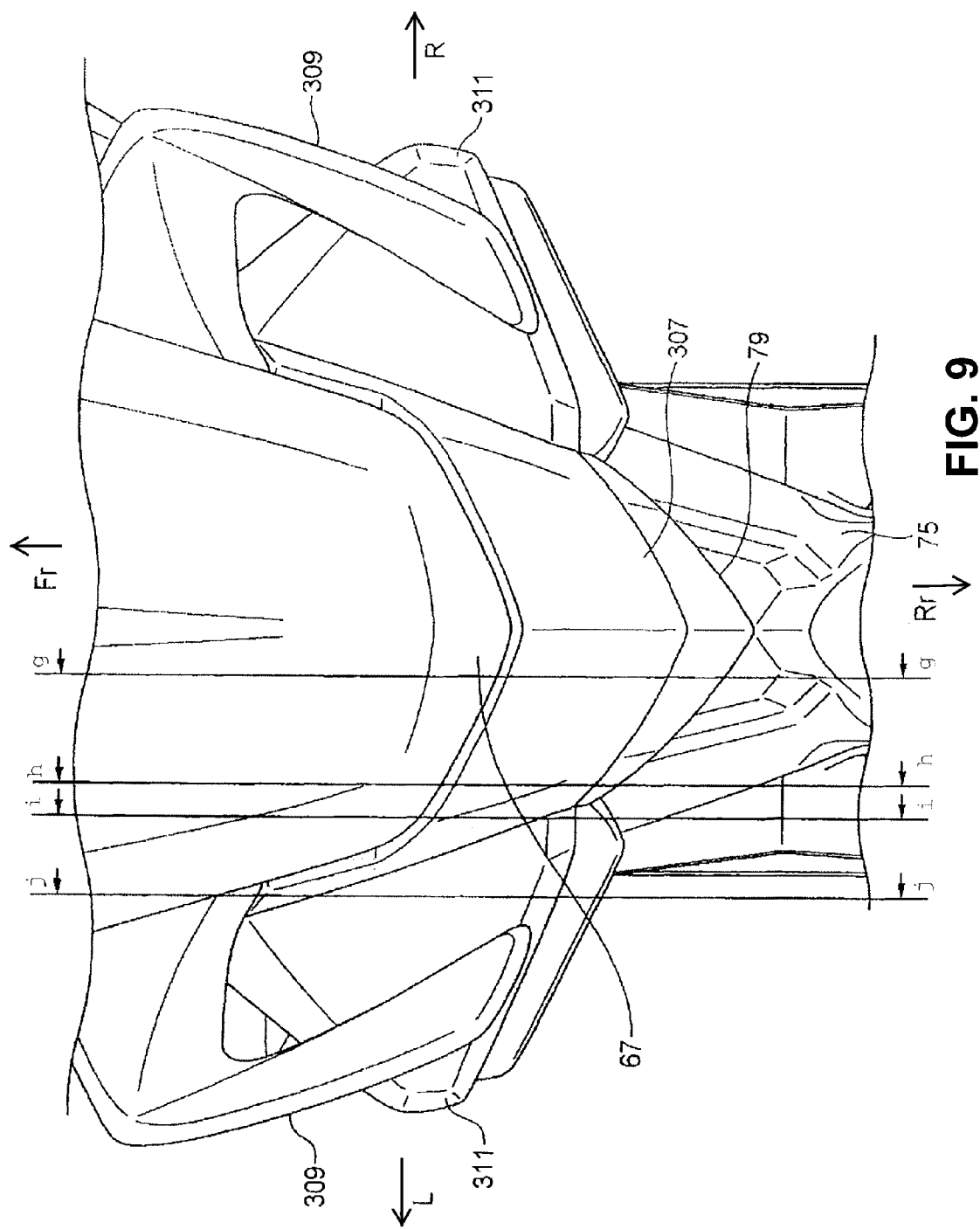
FIG. 9 is a detail top plan view of a rear portion of a vehicle body, with the pillion seat mounted thereto according to an illustrative embodiment of the present invention.
Figure 10:
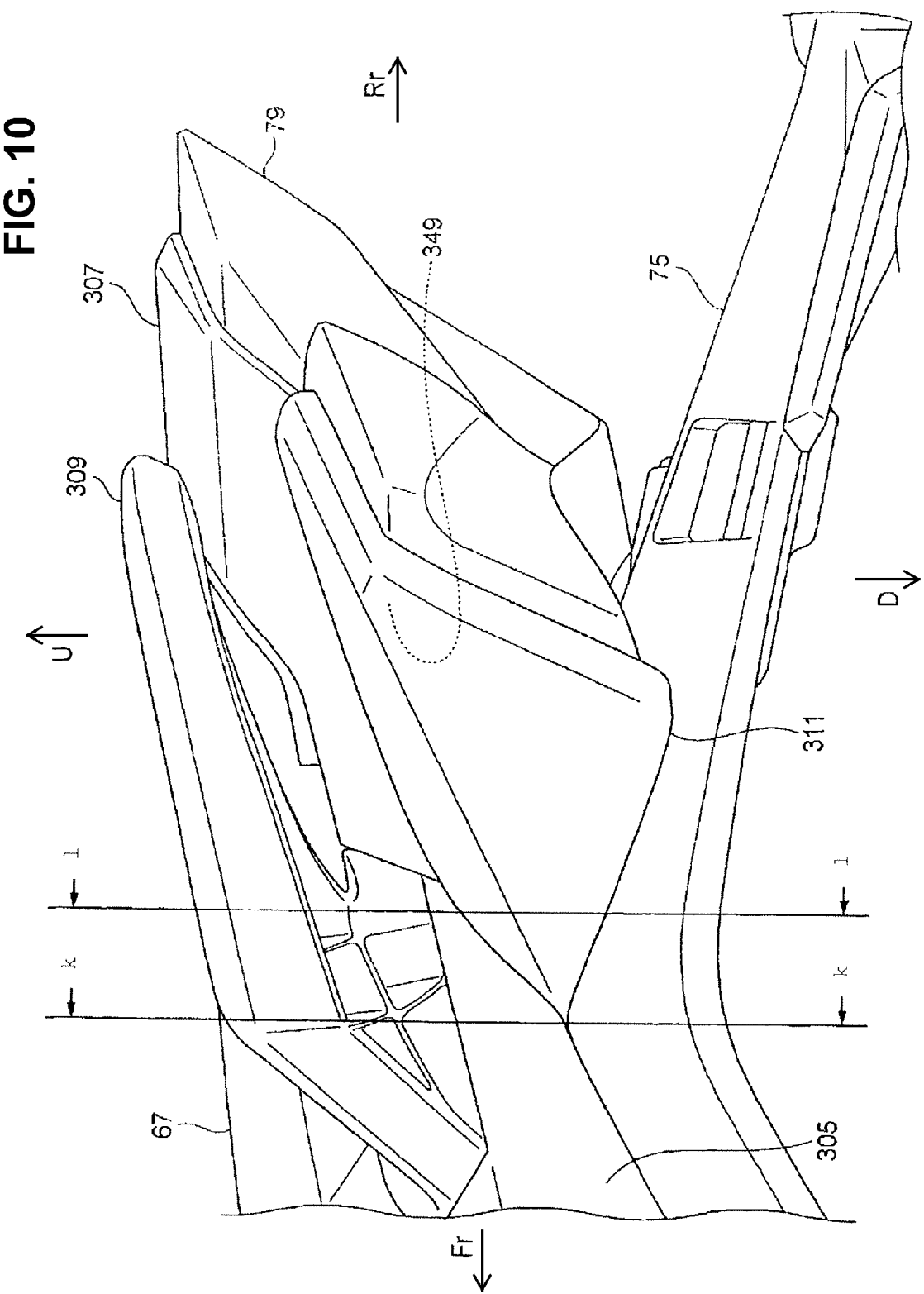
FIG. 10 is a detail side view of a left rear portion of the vehicle body according to an illustrative embodiment of the present invention, as seen through the turn signal cover.

Incidentally, in the fixing structure for the turn signal covers 311 shown in FIG. 6, the fixing seat 357 of the rear center cowl portion 307 and the arm 333 of the turn signal cover 311 have each been fastened to the stay 331 provided at the rear reflective surface 329 of the rear lamp assembly 79. In this connection, the stay 331 may be replaced by a stay 331A in which the erect tip of the fixing plate 337 is bent into an L-shape. According to this modification, the parts to be fixed can be fixed directly to the fixing plate 337 extending from the rear fender 75, so that fixation strength of the fixing seat 357 and the arm 333 can be further enhanced. In addition, the rear reflective surface 329 of the rear lamp assembly 79 can be simplified in shape.

As has been described above, according to the motorcycle of the present illustrative embodiment, release of the fastening of the turn signal cover arm 333 in the condition where the seat 67 has been removed ensures that only the turn signal cover 311 can be removed from the vehicle. Since the removal of the turn signal cover 311 causes the turn signal socket 325 in the rear lamp assembly 79 to be exposed, maintenance of the turn signals can be carried out by only removing the turn signal covers 311.

In addition, according to the motorcycle of the present illustrative embodiment, the turn signal covers 311 and the center cover 307 are locked together by slits 367 and the interlocking engagements 345, so that backlash of the turn signal covers 311 can be prevented when in their mounted state. Further, at the time of removing the turn signal cover 311, the fastening of the turn signal cover arm 333 is released, and thereafter the turn signal cover 311 is slid in the direction along the slit 367 to release the lock between the interlocking member 345 and the slit 367, the turn signal cover 311 is drawn out toward the outer side. Accordingly, the turn signal cover 311 can be removed easily.

Further, according to the motorcycle of the present illustrative embodiment, vertical vibrations of the turn signal covers 311 can be prevented by fastening the turn signal covers 311 in the vertical direction.

Moreover, according to the motorcycle of the present illustrative embodiment, stays can be provided in the form of the stay 331 of the rear lamp assembly 79, whereby the number of component parts does not increase. Further, since the turn signal cover arm 333 and the turn signal cover 311 are both fastened at the stay 331, the number of fastening parts can be reduced.

Further still, according to the motorcycle of the present illustrative embodiment, the gaps between the rear lamp upper surface and the turn signal covers 311 as well as the center cover 307 can be reduced as much as possible, and vibrations of the rear ends of both the covers can be restricted.

In addition, according to the motorcycle of the present illustrative embodiment, mating and holding of the turn signal covers 311 and the center cover 307 at their rear portions can be achieved more assuredly.

Although the present invention has been described herein with respect to a number of specific illustrative embodiments, the foregoing description is intended to illustrate, rather than to limit the invention. Those skilled in the art will realize that many modifications of the preferred embodiment could be made which would be operable. All such modifications, which are within the scope of the claims, are intended to be within the scope and spirit of the present invention.

What is claimed is:

1. A saddle-type vehicle comprising:
a vehicle body frame;
a rear cowl for covering a rear portion of the body frame, the rear cowl provided with an opening at its upper portion, the opening being closed by a seat; and
a rear lamp assembly comprising:
a tail lamp;
a left-right pair of turn signals;
a plurality of stays provided on the upper side in the rear lamp;
a center cover which covers an upper side of a tail lamp part of the rear lamp; and
a plurality of turn signal covers for covering an upper side of the rear lamp,
wherein each of the turn signal covers has an arm located on a lower side of the seat and extending toward an inner side in a vehicle width direction and the arm is fastened to the stay, and wherein a rear portion of the rear lamp is disposed in a rear portion of the rear cowl and faces rearwardly.

2. The saddle-type vehicle according to claim 1, wherein:
the center cover is provided, at side portions thereof, with ribs extending downwardly, each rib having a slit formed therein, and
each of the turn signal covers is provided with a side interlocking engagement such that the interlocking engagement is locked into one of the slits of the center cover.

3. The saddle-type vehicle according to claim 1, wherein a rear fender is mounted on a lower side of the rear cowl above a rear wheel, and wherein a lower surface of the turn signal cover is fastened to a lower surface of the rear fender.

4. The saddle-type vehicle according to claim 1, wherein the stay is formed at a rear reflective surface of the rear lamp, and wherein the arm of the turn signal cover and the center cover are both fastened to the stay.

5. The saddle-type vehicle according to claim 1, wherein the turn signal covers and the center cover are each provided at their rear portions with rear interlocking engagements, each of which is engaged with a recess formed in an upper surface of the rear lamp.

6. The saddle-type vehicle according to claim 1,
wherein the center cover is provided with a plurality of first engagement recesses for engagement with rear portions of inside edges of the turn signal covers, and wherein the turn signal cover is provided at a rear portion of a lower surface thereof with at least one second engagement recess for engagement with a rear edge of the center cover.

7. The saddle-type vehicle according to claim 3, wherein a fixing plate extends from the rear fender, and wherein the arm of the turn signal cover and the center cover are operatively connected to the fixing plate.

8. The saddle-type vehicle according to claim 7, wherein the fixing plate is formed in a substantially L-shape.

9. A rear lamp assembly for mounting on a rear cowl of a saddle-type vehicle, said rear lamp assembly comprising:
   a tail lamp;
   a left-right pair of turn signals;
   a plurality of stays provided on the upper side in the rear lamp;
   a center cover which covers an upper side of a tail lamp part of the rear lamp; and
   a plurality of turn signal covers for covering an upper side of the rear lamp,
   wherein each of the turn signal covers has an arm located on a lower side of the seat and extending inwardly in a vehicle width direction, the arm fastened to the stay,
   and wherein a rear portion of the rear lamp is disposed in a rear portion of the rear cowl in the state of being exposed at the rear end of the rear cowl so as to face rearward.

10. The rear lamp assembly according to claim 9, wherein the center cover is provided, at side portions thereof, with ribs extending downwardly,
   wherein each rib is provided with a slit, and
   wherein each of the turn signal covers is provided with a side interlocking engagement such that the interlocking engagement is locked into one of the slits of the center cover.

11. The rear lamp assembly according to claim 9,
   wherein a rear fender is mounted such that it is disposed on a lower side of the rear cowl above a rear wheel, and
   wherein a lower surface of the turn signal cover is fastened to a lower surface of the rear fender.

12. The rear lamp assembly according to claim 9, wherein the stay is formed at a rear reflective surface of the rear lamp, and wherein the arm of the turn signal cover and the center cover are both fastened to the stay.

13. The rear lamp assembly according to claim 9, wherein the turn signal covers and the center cover are provided at their respective rear portions with rear interlocking engagements, each of which is engaged with a recess formed in an upper surface of the rear lamp.

14. The rear lamp assembly according to claim 9,
   wherein the center cover is provided with a plurality of first recesses for engagement with rear portions of inside edges of the turn signal covers, and
   wherein the turn signal cover is provided at a rear portion of a lower surface thereof with at least one second recess for engagement with a rear edge of the center cover.

15. The rear lamp assembly according to claim 11, wherein a fixing plate extends from the rear fender, and wherein the arm of the turn signal cover and the center cover can be fastened to the fixing plate.

16. The rear lamp assembly according to claim 15, wherein the fixing plate is formed in a substantially L-shape.

* * * * *